United States Patent
Matsuo et al.

(10) Patent No.: US 8,340,963 B2
(45) Date of Patent: Dec. 25, 2012

(54) ECHO SUPPRESSING SYSTEM, ECHO SUPPRESSING METHOD, RECORDING MEDIUM, ECHO SUPPRESSOR, SOUND OUTPUT DEVICE, AUDIO SYSTEM, NAVIGATION SYSTEM AND MOBILE OBJECT

(75) Inventors: Naoshi Matsuo, Kawasaki (JP); Taisuke Itou, Osaka (JP)

(73) Assignee: Fujitsu Limited, Kawasaki (JP)

( * ) Notice: Subject to any disclaimer, the term of this patent is extended or adjusted under 35 U.S.C. 154(b) by 229 days.

(21) Appl. No.: 12/756,768

(22) Filed: Apr. 8, 2010

(65) Prior Publication Data
US 2010/0191527 A1    Jul. 29, 2010

Related U.S. Application Data

(63) Continuation of application No. PCT/JP2007/073776, filed on Dec. 10, 2007.

(51) Int. Cl.
G10L 21/02 (2006.01)
G10L 15/00 (2006.01)
A61F 11/06 (2006.01)
G10K 11/16 (2006.01)

(52) U.S. Cl. ........ 704/226; 704/200; 704/227; 704/228; 704/231; 704/233; 381/71.1; 381/71.2; 381/71.3; 381/71.4; 381/71.5; 381/71.6; 381/71.7; 381/71.9; 381/71.11; 381/71.14

(58) Field of Classification Search .................. 704/200, 704/226–228, 231, 233; 381/71.1–71.14
See application file for complete search history.

(56) References Cited

U.S. PATENT DOCUMENTS

| 5,212,764 | A |   | 5/1993 | Ariyoshi |
| 5,561,668 | A | * | 10/1996 | Genter .......................... 370/288 |
| 5,859,914 | A | * | 1/1999 | Ono et al. ........................ 381/66 |
| 5,889,857 | A | * | 3/1999 | Boudy et al. ............. 379/406.14 |
| 6,411,926 | B1 | * | 6/2002 | Chang ........................... 704/221 |
| 6,628,781 | B1 | * | 9/2003 | Grundstrom et al. ..... 379/406.14 |
| 6,674,865 | B1 | * | 1/2004 | Venkatesh et al. ............ 381/107 |

(Continued)

FOREIGN PATENT DOCUMENTS
EP    1 158 494 A1    11/2001
(Continued)

OTHER PUBLICATIONS

English language International Search Report for PCT/JP2007/073776, mailed on Mar. 11, 2008.
(Continued)

*Primary Examiner* — Paras D Shah
(74) *Attorney, Agent, or Firm* — Staas & Halsey LLP

(57) ABSTRACT

An echo suppressing system includes: a sound output device for outputting sound based on a sound signal, including a passing section for allowing passage of a component of a different frequency band, and a plurality of sound output sections, each of which outputs sound based on each of the plurality of sound signals passed through the passing section; a summer for summing the plurality of sound signals to generate a reference sound signal; a sound input device for converting input sound into a sound signal; and an echo suppressor for suppressing echo based on the sound output by the sound output device, including an input section to which a sound signal is input from the sound input device as an observation sound signal, and a correction section for correcting the observation sound signal so as to suppress echo included in the observation sound signal.

18 Claims, 29 Drawing Sheets

U.S. PATENT DOCUMENTS

| | | | |
|---|---|---|---|
| 6,885,752 B1* | 4/2005 | Chabries et al. | 381/321 |
| 7,133,478 B2* | 11/2006 | Vierthaler | 375/350 |
| 2002/0169603 A1* | 11/2002 | Sculley | 704/229 |
| 2002/0181698 A1* | 12/2002 | Takahashi et al. | 379/406.01 |
| 2004/0071284 A1 | 4/2004 | Abutalebi et al. | |
| 2005/0254640 A1* | 11/2005 | Ohki et al. | 379/406.1 |
| 2006/0182291 A1* | 8/2006 | Kunieda et al. | 381/110 |
| 2007/0019825 A1* | 1/2007 | Marumoto et al. | 381/94.1 |
| 2007/0121952 A1 | 5/2007 | Engdegard et al. | |
| 2007/0274535 A1* | 11/2007 | Mao | 381/94.1 |
| 2008/0004868 A1* | 1/2008 | Nongpiur et al. | 704/207 |
| 2008/0304672 A1* | 12/2008 | Yoshizawa et al. | 381/56 |
| 2009/0059821 A1* | 3/2009 | Wu et al. | 370/286 |

FOREIGN PATENT DOCUMENTS

| | | |
|---|---|---|
| JP | 2-278298 | 11/1990 |
| JP | 7-22985 | 1/1995 |
| JP | 7-219596 | 8/1995 |
| JP | 8-213937 | 8/1996 |
| JP | 10-161694 | 6/1998 |
| JP | 11-331046 | 11/1999 |
| JP | 2002-32100 | 1/2002 |
| JP | 2002-237769 | 8/2002 |
| JP | 2002-368658 | 12/2002 |
| JP | 2003-284183 | 10/2003 |
| JP | 2004-222103 | 8/2004 |
| JP | 2005-136448 | 5/2005 |
| JP | 2005-536128 | 11/2005 |
| JP | 2006-524832 | 11/2006 |
| WO | 2004/017303 A1 | 2/2004 |
| WO | 2004/097794 A2 | 11/2004 |

OTHER PUBLICATIONS

Japanese Office Action mailed Mar. 21, 2012 issued in corresponding Japanese Patent Application No. 2009-536910.

* cited by examiner

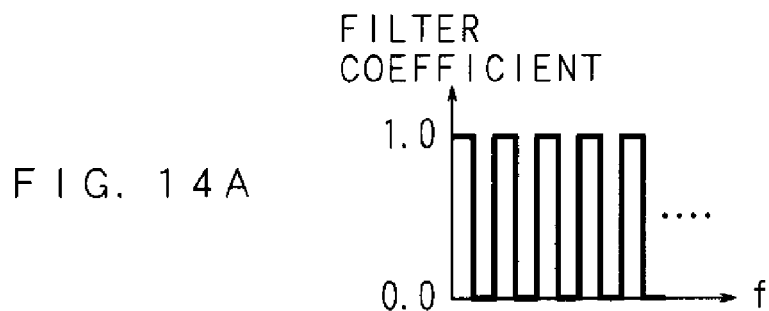
F I G. 1 4 A
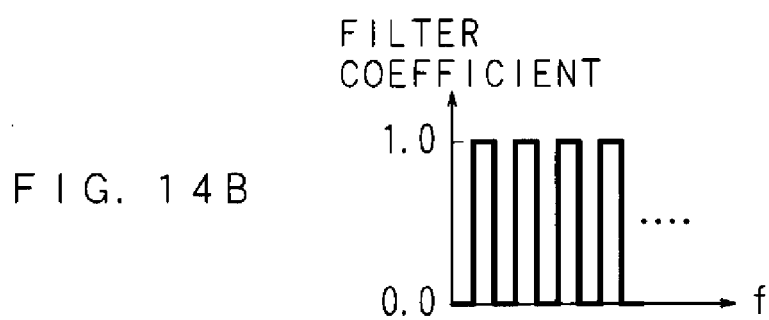
F I G. 1 4 B
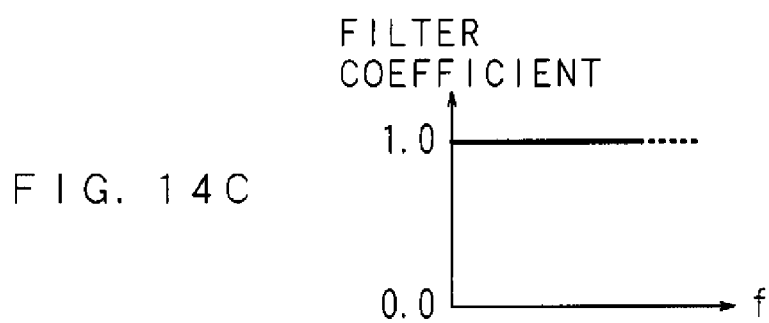
F I G. 1 4 C
F I G. 1 4 D
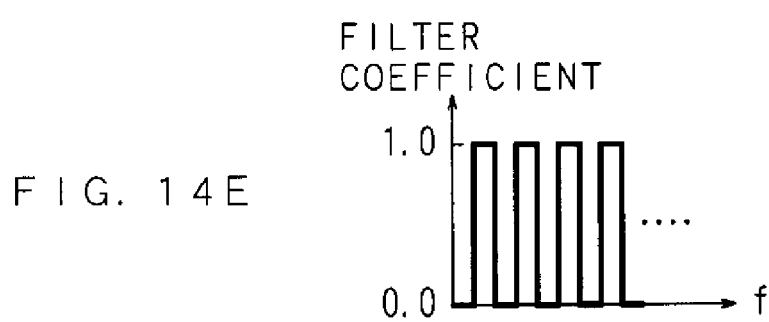
F I G. 1 4 E

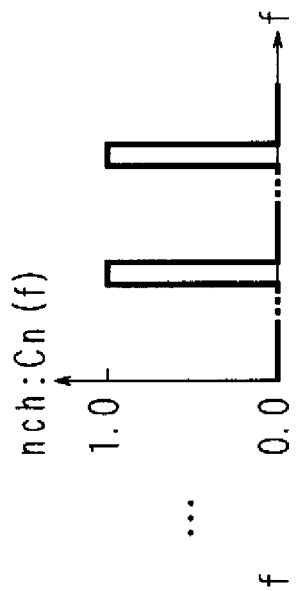
FIG. 29A
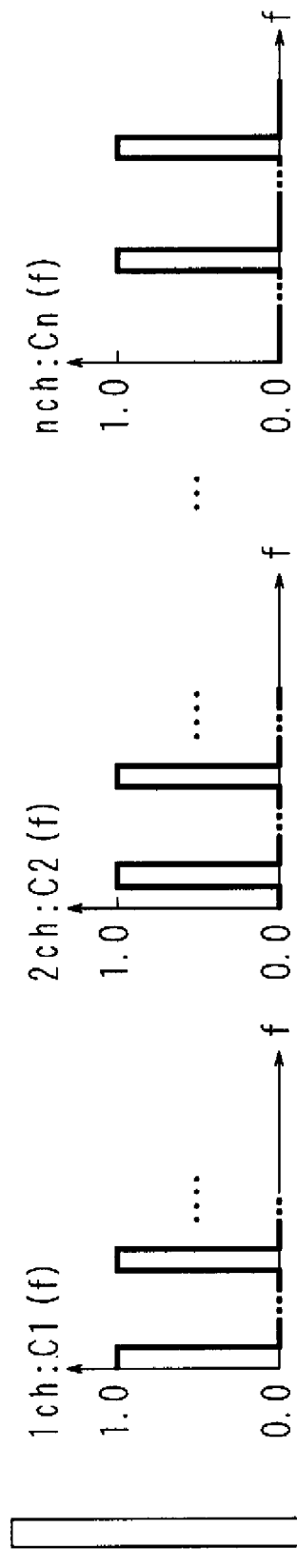
FIG. 29B
FIG. 29C
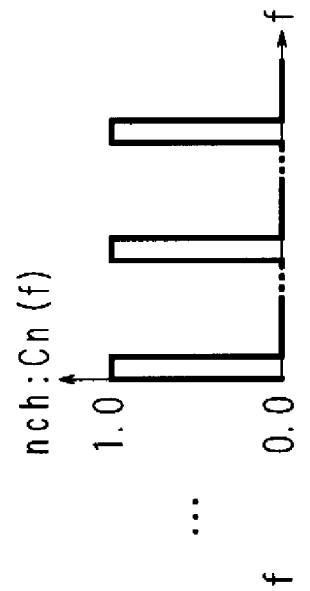
FIG. 29D
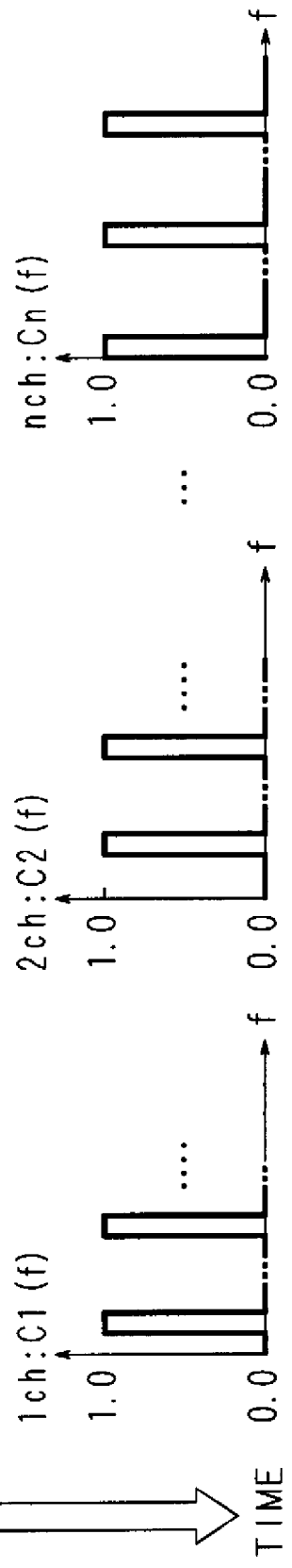
FIG. 29E
FIG. 29F

ECHO SUPPRESSING SYSTEM, ECHO SUPPRESSING METHOD, RECORDING MEDIUM, ECHO SUPPRESSOR, SOUND OUTPUT DEVICE, AUDIO SYSTEM, NAVIGATION SYSTEM AND MOBILE OBJECT

CROSS-REFERENCE TO RELATED APPLICATIONS

This application is a continuation, filed under U.S.C. §111 (a), of PCT International Application No. PCT/JP2007/073776 which has an international filing date of Dec. 10, 2007 and designated the United States of America, and claims priority to PCT International Application No. PCT/JP2007/069930, filed on Oct. 12, 2007; the entire disclosures of both international applications being incorporated by reference as a part of this application.

TECHNICAL FIELD

The present invention relates to an echo suppressing system including a sound output device for outputting sound based on a sound signal, a sound input device to which sound is input and an echo suppressor for suppressing echo based on the sound output by the sound output device from the sound input to the sound input device, and also relates to an echo suppressing method applied to the echo suppressing system, a recording medium recording an echo suppressing program for realizing the echo suppressor used in the echo suppressing system, an echo suppressor and a sound output device used in the echo suppressing system, and to an audio system, a navigation system and a mobile object which employ the echo suppressing system.

BACKGROUND

In voice recognition for the conventional car navigation system, for example, a speaker presses down a talking switch before starting a speech, which silences the car navigation system, preventing the sound output by a loudspeaker of the car navigation system from being transferred to a microphone as echo, which may be a cause of false voice recognition. Users, however, desire to be able to operate by voice recognition without silencing of the output sound. To meet such a request, an echo suppressing method for suppressing the sound transferred from a loudspeaker to a microphone is required. Moreover, since a plurality of speakers are used for audio in a car, i.e. a car audio system, to respond to a plurality of channels, an echo suppressing method which addresses echo transferred from a multichannel car audio system to a microphone used for voice recognition or the like is desired.

According to the Japanese Laid-open Patent Publication No. 2002-237769, an echo suppressor has been proposed in which an echo suppressing method that addresses a monaural channel audio system is applied to a multichannel audio system.

However, the echo suppressing method requires a suppression mechanism corresponding to each channel and increases in cost and size of a device. The problem of size is serious especially when the device is applied to a car navigation system for which the installation space is largely limited.

Moreover, when reference sound signals are added up to obtain a summed reference sound signal of a monaural channel, a problem occurs such that unsuppressed residual echo becomes larger. This is because the reproduced sound and intensity of each loudspeaker varies independently in the output of sound such as music by the multichannel audio apparatus, which degrades presumption accuracy if echo from a plurality paths are learned by one adaptive processing.

SUMMARY

An echo suppressing system includes: a sound output device for outputting sound based on a sound signal, including a passing section for allowing passage of a component of a different frequency band for each of a plurality of sound signals, and a plurality of sound output sections, each of which outputs sound based on each of the plurality of sound signals passed through the passing section; a summer for summing the plurality of sound signals passed through the passing section to generate a reference sound signal; a sound input device for converting input sound into a sound signal; and an echo suppressor for suppressing echo based on the sound output by the sound output device from the sound input to the sound input device, including an input section to which a sound signal is input from the sound input device as an observation sound signal, and a correction section for correcting the observation sound signal so as to suppress echo included in the observation sound signal based on the observation sound signal and the reference sound signal.

The object and advantages of the invention will be realized and attained by the elements and combinations particularly pointed out in the claims. It is to be understood that both the foregoing general description and the following detailed description are exemplary and explanatory and are not restrictive of the embodiment, as claimed.

BRIEF DESCRIPTION OF THE DRAWINGS

FIGS. 14A-14E are graphic charts illustrating a filter coefficient of a pass filter of the passing mechanism included in the sound output device according to Embodiment 2.

FIGS. 29A-29F are explanatory diagrams illustrating an example of change over time of a filter coefficient of each band-pass filter section of the passing mechanism included in the sound output device according to Embodiment 7.

DESCRIPTION OF EMBODIMENTS

Embodiment 1

Figure 1:
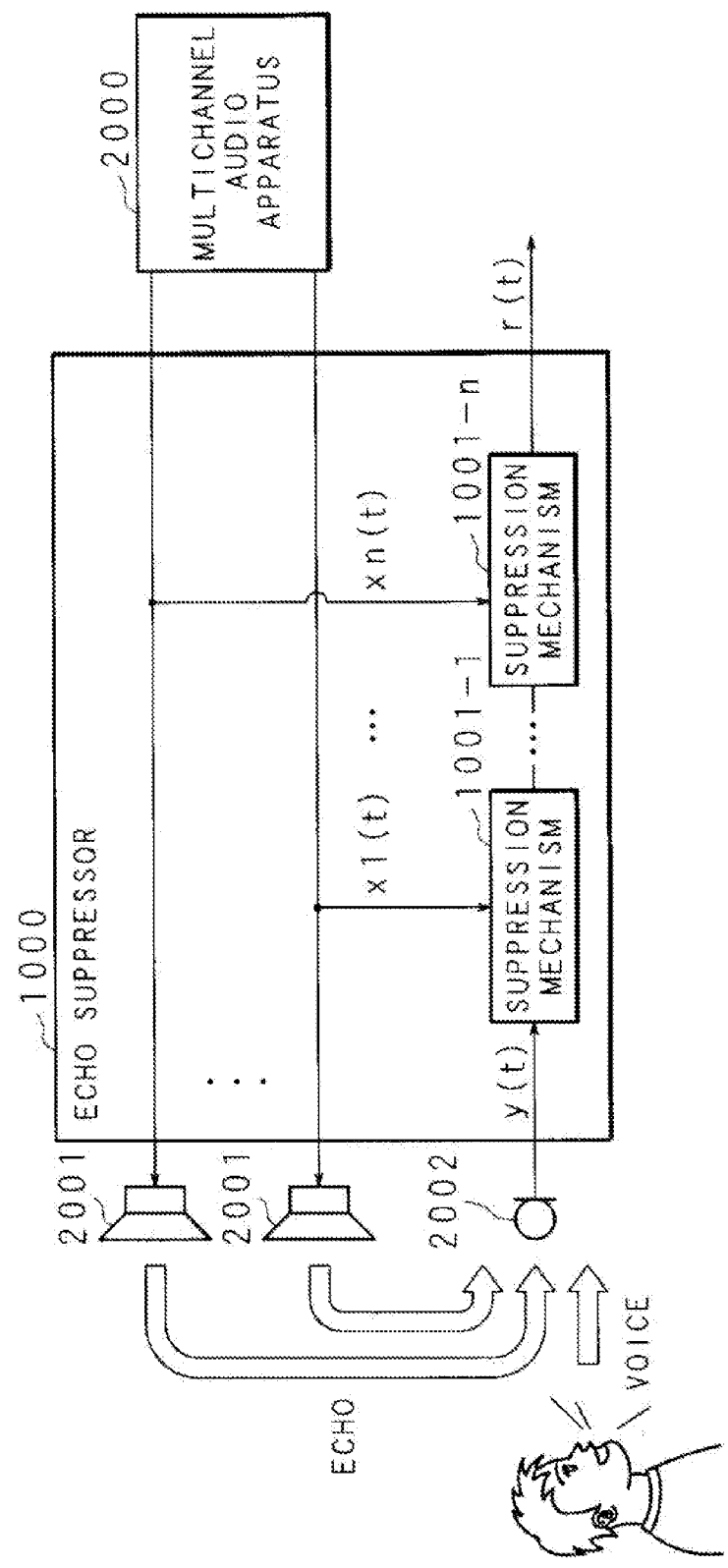
FIG. 1 is a schematic diagram illustrating the conventional first echo suppressor.

FIG. 1 is a schematic diagram illustrating the conventional first echo suppressor. An echo suppressor is denoted by 1000 in FIG. 1. The echo suppressor 1000 outputs sound signals of a plurality of channels output from a multichannel audio apparatus 2000 to a plurality of loudspeakers 2001, 2001,..., each of the loudspeakers 2001, 2001,... outputting sound based on each sound signal. The echo suppressor 1000 then removes echo based on the output sound of a plurality of channels from the sound received at a microphone 2002. Echo is removed by suppressing the echo corresponding to each of reference sound signals $x1(t), \ldots, xn(t)$ based on the output sound of a plurality of channels (n) from an observation sound signal $y(t)$ based on the received sound, at a plurality of suppression mechanisms (echo cancellers) that correspond to the reference sound signals $x1(t), \ldots, xn(t)$ of the respective channels.

Figure 2:
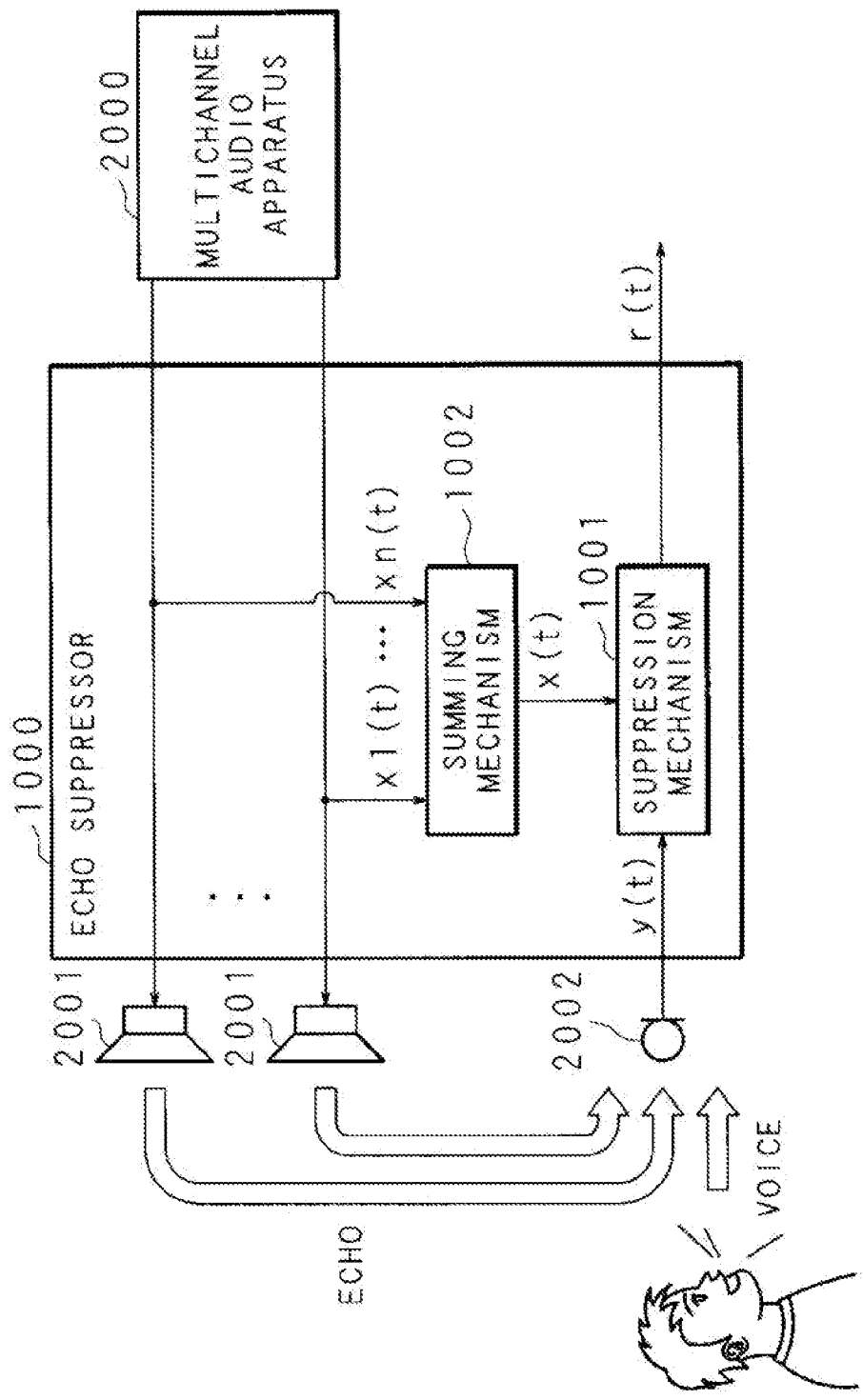
FIG. 2 is a schematic diagram illustrating the conventional second echo suppressor.

A form of the echo suppressor other than that of FIG. 1, in which the echo suppressing method that addresses the monaural channel audio system is applied to the multichannel audio system, has also been proposed. FIG. 2 is a schematic diagram illustrating the conventional second echo suppressor. The second echo suppressor 1000 generates a summed reference sound signal $x(t)$ at a summing mechanism 1002 which sums up the reference sound signals $x1(t), \ldots, xn(t)$ based on the sound of a plurality of channels, and suppresses echo from the observation sound signal $y(t)$ based on the summed reference sound signal $x(t)$ at one suppression mechanism 1001.

Figure 3:
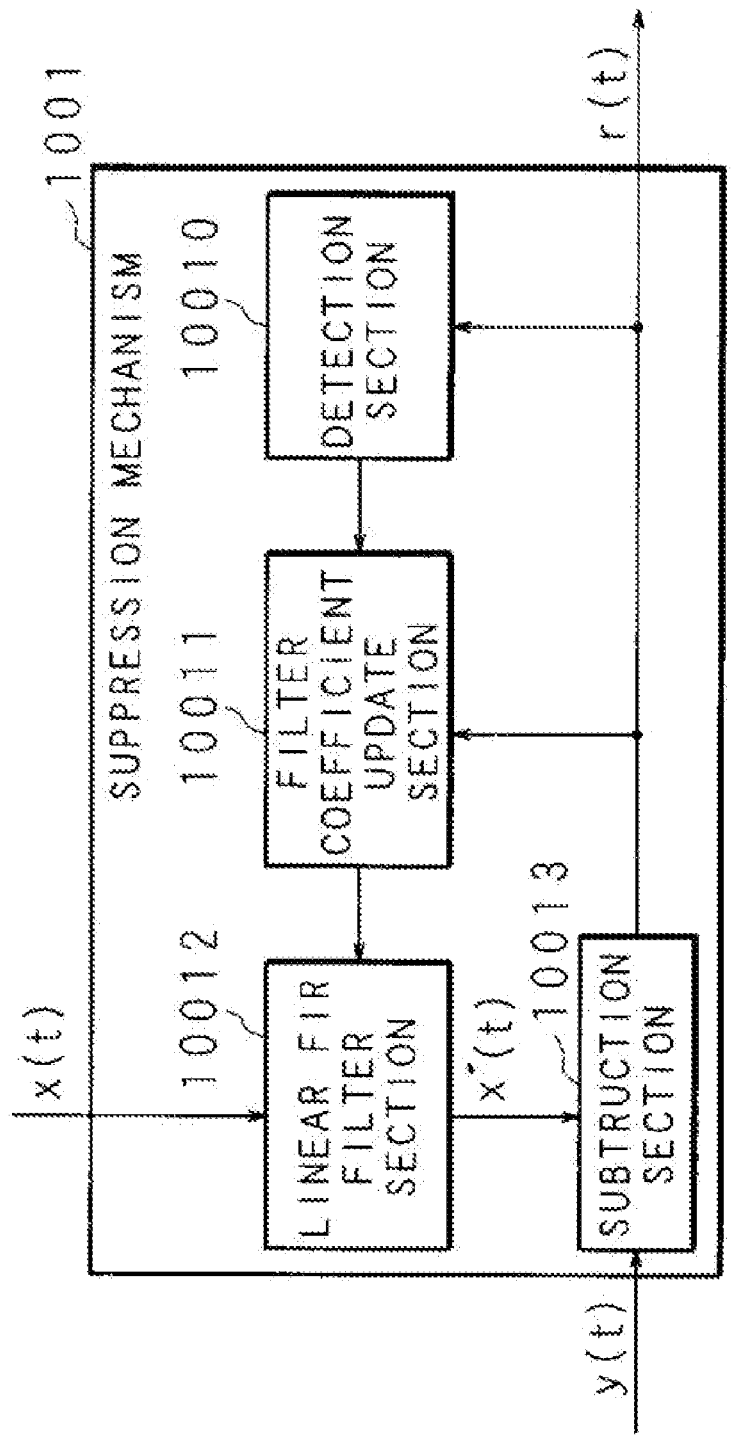
FIG. 3 is a functional block diagram illustrating a suppression mechanism included in the conventional echo suppressor.

FIG. 3 is a functional block diagram illustrating the suppression mechanism 1001 included in the conventional echo suppressor. The suppression mechanism 1001 includes a detection section 10010 for detecting a double talk state in which a speaker is talking or a single talk state in which no speaker is talking, a filter coefficient update section 10011 for updating a filter coefficient required for presumption of echo by an adaptive processing using the learning identification method, a linear FIR filter section 10012 for presuming an echo signal $x'(t)$ from the reference sound signal $x(t)$ by a product-sum operation of several hundreds order using a filter coefficient, and a subtraction section 10013 for outputting a suppression result $r(t)$ obtained by suppressing echo by subtracting the echo signal $x'(t)$ from the observation sound signal $y(t)$. The detection section 10010 detects the single talk state or the double talk state based on change in intensity of the suppression result $r(t)$, and aborts update of the filter coefficient by the filter coefficient update section 10011 in the double talk state. The filter coefficient update section 10011 calculates a filter coefficient based on the suppression result $r(t)$.

The echo suppressor 1000 illustrated in FIG. 1 includes a suppression mechanism 1001 illustrated in FIG. 3 for each of the reference sound signals $x1(t), \ldots, xn(t)$.

Figure 4:
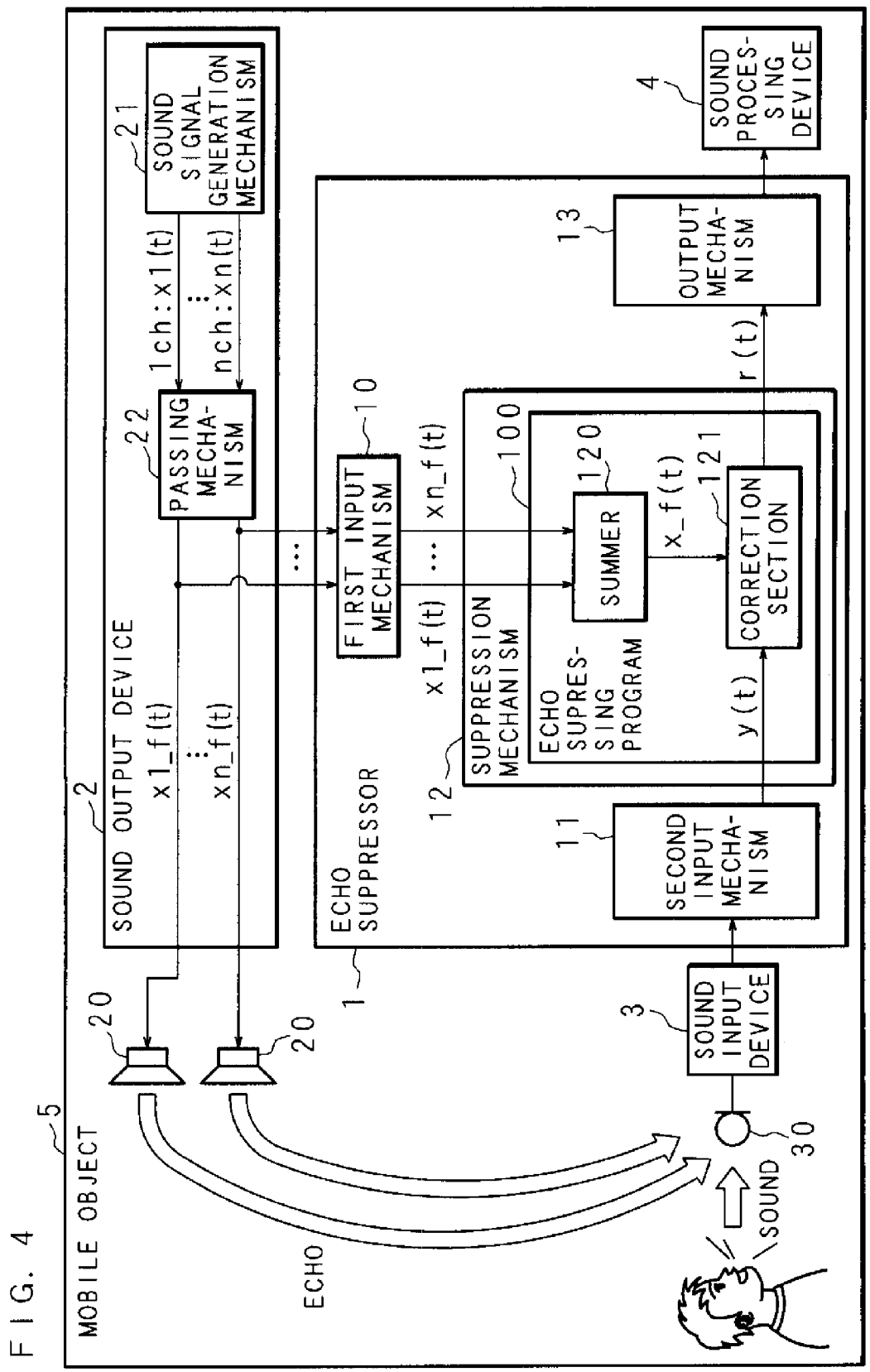
FIG. 4 is a block diagram schematically illustrating an example of an echo suppressing system according to Embodiment 1.

FIG. 4 is a block diagram schematically illustrating an example of an echo suppressing system according to Embodiment 1. In FIG. 4, an echo suppressor used in an echo suppressing system which is applied to a system such as a car navigation system is denoted by 1. The echo suppressor 1 operates in cooperation with a sound output device 2 such as a multichannel audio apparatus having a plurality of sound output mechanisms 20, 20,... such as loudspeakers which output sound of a plurality of channels, a sound input device 3 having a sound input mechanism 30 using a microphone such as a condenser microphone, and a sound processing device 4 such as a voice recognition system. The echo suppressor 1, the sound output device 2, the sound input device 3 and the sound processing device 4 are mounted on a mobile object 5 such as a vehicle. The echo suppressing system of the present embodiment may be applicable not only to the car navigation system illustrated in FIG. 4 but also to various systems such as an audio system and a television conference system.

The sound output device 2 includes a sound signal generation mechanism 21 for reading sound data from a recording medium such as a music CD (Compact Disc) or a DVD (Digital Versatile Disc) which records sound data for example, generating sound signals for a plurality of channels based on the read sound data and outputting the generated plurality of sound signals as a multichannel audio apparatus signal, and a passing mechanism 22 constituted by a DSP (Digital Signal Processor) for allowing passage of a component of a different frequency band for each of the sound signals of a plurality of channels. The sound signals of the plurality of channels passed through the passing mechanism 22 are output from the sound output mechanisms 20, 20, . . . as sound of a plurality of channels. Moreover, the sound output device 2 transmits the sound signals of the plurality of channels that passed through the passing mechanism 22 to the echo suppressor 1. It is noted that the sound signal output from the sound signal generation mechanism 21 is an analog signal, which is converted into a digital signal as an A/D (Analog to Digital) converter (not illustrated) and output to the passing mechanism 22. The passing mechanism 22 outputs a sound signal of a digital signal, which is converted into an analog signal at a D/A (Digital to Analog) converter (not illustrated) and output to the sound output mechanisms 20, 20, . . . and the echo suppressor 1. A channel is allocated to each of the sound output mechanisms 20, 20, . . . , the sound signal passed through the passing mechanism 22 being output to each of the sound output mechanisms 20, 20, . . . corresponding to the channel. It is noted that the echo suppressing system of the present embodiment may appropriately be designed such that the sound output mechanisms 20, 20, . . . may have the function of outputting sound based on a digital sound signal so as to perform all input and output processes between mechanisms and devices with digital signals.

The sound input device 3 generates a sound signal of an analog signal based on the sound input by the sound input mechanism 30, amplifies the generated sound signal at an amplifier (not illustrated) such as a gain amplifier, converts the amplified sound signal to a digital signal by sampling at a sampling frequency of e.g. 8000 Hz or 12000 Hz using an A/D converter (not illustrated) and outputs the sound signal, which is converted into the digital signal, to the echo suppressor 1.

The echo suppressor 1 includes a first input mechanism 10 to which sound signals of a plurality of channels output from the sound output device 2 are input, a second input mechanism 11 to which a sound signal output from the sound input device 3 is input as an observation sound signal, a suppression mechanism 12 such as a DSP for suppressing an echo component included in the observation sound signal, and an output mechanism 13 for outputting the observation sound signal, for which the echo component is suppressed at the suppression mechanism 12, to the sound processing device 4.

The suppression mechanism 12 incorporates firmware such as an echo suppressing program 100 and data, and generates, by executing the echo suppressing program 100 of the present embodiment incorporated as firmware, various program modules such as a summer 120 for summing sound signals of a plurality of channels which are input at the first input mechanism 10 to generate a reference sound signal and a correction section 121 for correcting an observation sound signal based on the observation sound signal and the reference sound signal so as to suppress echo included in the observation sound signal. By executing the generated various program modules, the suppression mechanism 12 included in the echo suppressor 1 functions as an echo canceller for removing echo based on the sound output by each of the sound output mechanisms 20, 20, . . . , from the sound input to the sound input mechanism 30.

Moreover, the first input mechanism 10 includes an A/D converter for converting the sound signals of a plurality of channels that are analog signals input from the sound output device 2 into digital signals. If, however, the sound signals are input from the first input mechanism 10 as digital signals, there is no need for an A/D converter. Moreover, the function of an amplifier and an A/D converter included in the sound input device 3 may also be included in the second input mechanism 11.

The example illustrated in FIG. 4 is a mere example of countless possibilities of the present embodiment. Hardware and software configurations may appropriately be changed according to needs. Implementation may appropriately be varied by, for example, constructing each program module as hardware in which an operation circuit such as VLSI is used, or including the function of the summer 120 in the sound output device 2. Moreover, when the summer 120 is constructed as hardware outside the suppression mechanism 12, the summer 120 using a mixing circuit for mixing analog signals may be employed. In that case, the sound signals of a plurality of channels that are analog signals input from the sound output device 2 are mixed (at the operation Summed) at the summer 120 and then converted into digital signals by an A/D converter (not illustrated).

In FIG. 4, $1ch$, . . . , nch (n is a natural number) denote a plurality of channels, while $x1(t)$, . . . , $xn(t)$ denote sound signals of 1 to n channels output from the sound output mechanism 20 to the passing mechanism 22. Note that the variable t is a sample number for identifying each sample when an analog sound signal is converted into a digital signal by sampling it at a sampling frequency of 8000 Hz, 12000 Hz or the like. Moreover, $x1\_f(t)$, . . . , $xn\_f(t)$ denote sound signals of 1 to n channels that passed through the passing mechanism 22. By summing the sound signals $x1\_f(t)$, . . . , $xn\_f(t)$ that passed through the passing mechanism 22, a reference sound signal $x\_f(t)$ is generated. Furthermore, $y(t)$ denotes an observation sound signal, while $r(t)$ is a sound signal indicating the suppression result obtained by suppressing an echo component of the observation sound signal $y(t)$ at the suppression mechanism 12, the suppression result $r(t)$ being output to the sound processing device 4 where a process such as voice recognition is performed.

Figure 5:
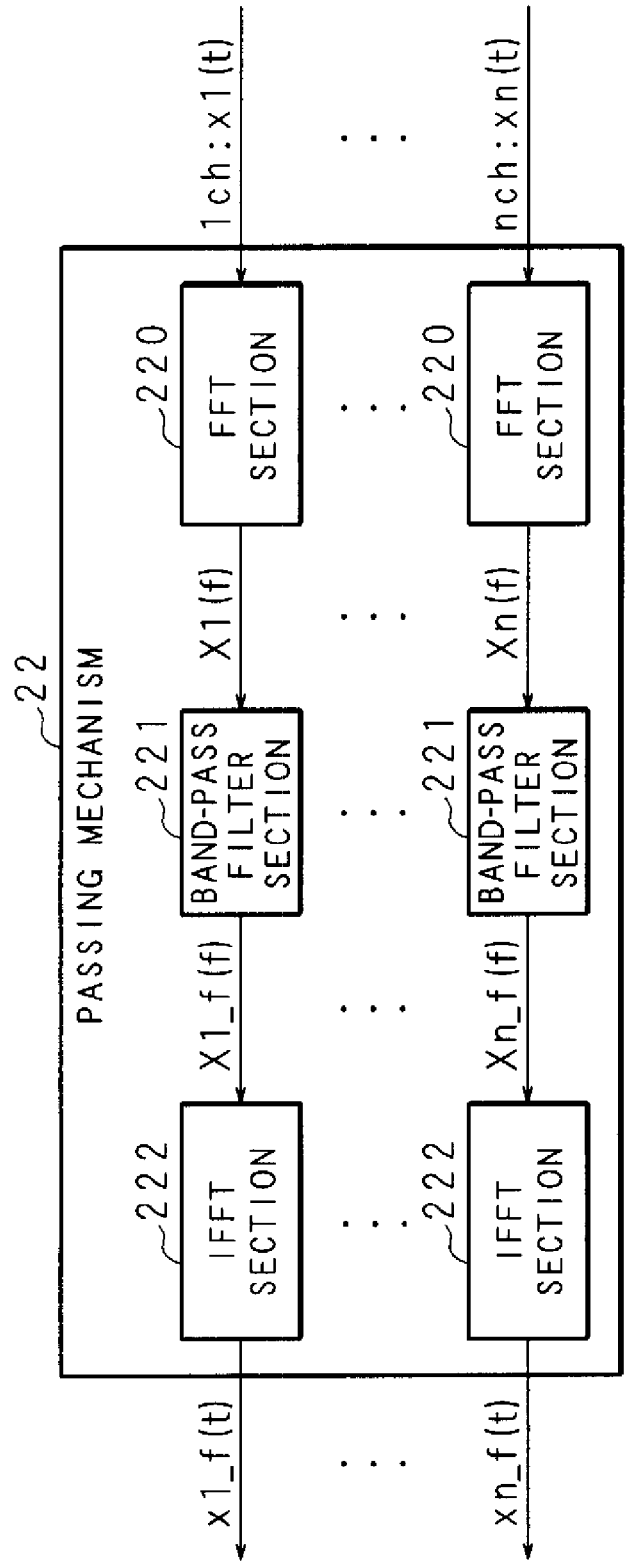
FIG. 5 is a functional block diagram illustrating an example of a passing mechanism of a sound output device according to Embodiment 1.

FIG. 5 is a functional block diagram illustrating an example of the passing mechanism 22 of the sound output device 2 according to Embodiment 1. The passing mechanism 22 using DSP executes various program modules such as FFT sections 220, 220, . . . , for converting the input sound signals of a plurality of channels into sound signals on a frequency axis by an FFT (Fast Fourier Transformation) process, a plurality of band-pass filter sections 221, 221, . . . for allowing passage of components of different frequency bands for the plurality of sound signals converted into the components on a frequency axis, and a plurality of IFFT sections 222, 222, . . . for converting the plurality of sound signals for which components of frequency bands passed through and which are converted into components on a frequency axis into sound signals on time axes by an IFFT (Inverse Fast Fourier Transformation) process. In converting sound signals, the FFT section 220 generates sound signals in frames, each frame having signals of, for example, 512 samples. The frames overlap with each other by approximately 128 to 256 samples. For each frame, a frame processing which is general in the field of voice recognition is executed using, for example, window function with a hamming window, hanning window or the like and filtering by a high-emphasis filter. The FFT section 220 performs an FFT process for the generated sound signals in frames. Each of the band-pass filter sections 221, 221, . . . corresponds to a channel, while each sound signal converted into components on a frequency axis passes through each of the band-pass filter sections 221, 221, . . .

associated with its channel. Moreover, for each of the band-pass filter sections 221, 221, ..., a different filter coefficient indicating a permeation rate for each frequency is preset, and filtering is performed for a sound signal based on the preset filter coefficient.

In FIG. 5, x1(t), ..., xn(t) are sound signals of a plurality of channels input to the FFT sections 220, 220, ..., the FFT sections 220, 220, ... outputting a plurality of sound signals X1(f), ..., Xn(f) obtained by converting the sound signals x1(t), ..., xn(t) of a plurality of channels into components on a frequency axis to the band-pass filter sections 221, 221, .... Note that a variable f indicates frequency. Moreover, the band-pass filter sections 221, 221, ... output a plurality of sound signals X1_f(f), ..., Xn_f(f), for which components of the frequency bands are passed through, to the IFFT sections 222, 222, .... Furthermore, the IFFT sections 222, 222, ... converts a plurality of sound signals X1_f(f), ..., Xn_f(f), for which components of the frequency bands are passed through, into sound signals x1_f(t), ..., xn_f(t) on time axes, respectively, by the IFFT processing.

Figure 6A:
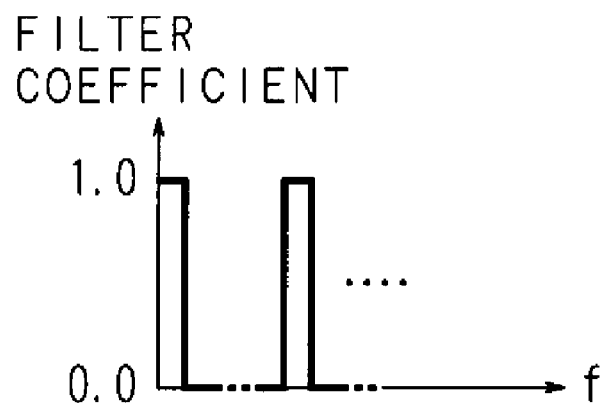
FIGS. 6A-6C are graphic charts illustrating a filter coefficient of a pass filter section in a passing mechanism included in the sound output device according to Embodiment 1.
Figure 6B:
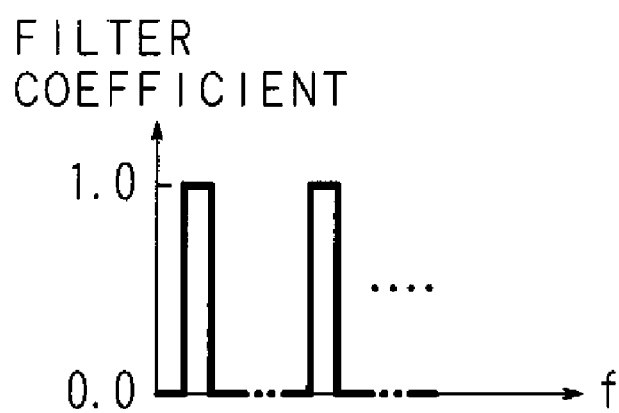
Figure 6C:
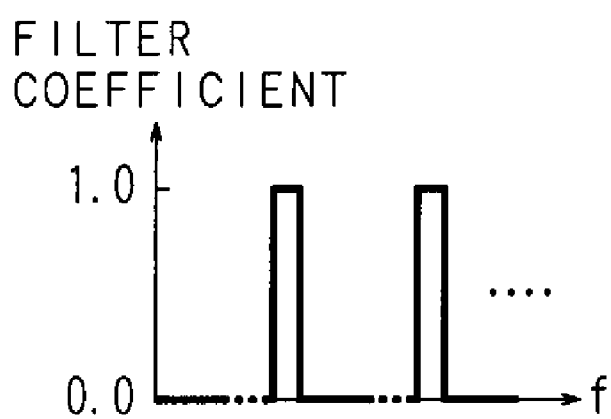

FIGS. 6A-6C are graphic charts illustrating a filter coefficient of the band-pass filter section 221 in the passing mechanism 22 included in the sound output device 2 according to Embodiment 1. FIGS. 6A, 6B and 6C are graphs indicating coefficient filters C1(f), C2(f) and Cn(f) for sound signals X1(f), X2(f) and Xn(f) of the first channel 1ch, the second channel 2ch and the Nth channel nch, respectively, and illustrating the relationship between frequency f indicated on the horizontal axis and a filter coefficient indicated on the vertical axis. The filter coefficient is a coefficient which is set for each frequency and is used for multiplying a sound signal. Each of the band-pass filter sections 221, 221, ... is a program module performing a process of multiplying a sound signal converted into components on a frequency axis with a filter coefficient which is set for each frequency. The process by the band-pass filter section 221 allows passage of a component in a frequency band with a filter coefficient of 1.0 through the band-pass filter section 221, whereas it removes a component in a frequency band with a filter coefficient of 0.0 because the amplitude becomes 0 when such a component passes through the band-pass filter section 221. As illustrated in FIGS. 6A, 6B and 6C, filter coefficients for the band-pass filter sections 221, 221, ... are set such that each of the band-pass filter sections 221, 221, ... allows passage of a component of a different frequency band.

At each of the band-pass filter sections 221, 221, ..., a frequency band is divided into frequency bands by a frequency width, and a filter coefficient is set such that a component in each of the divided frequency bands passes through only one of the band-pass filter sections 221. By setting a filter coefficient as illustrated in FIG. 6, each of the band-pass filter sections 221, 221, ... functions as a comb filter. In setting a filter coefficient for each of the band-pass filter sections 221, 221, ..., a filter coefficient may also be set such that logarithmic value of frequency band is divided by a logarithmic frequency width and a component of each of the divided frequency bands passes through only one band-pass filter section 221, to form a comb filter. By using a logarithmic value to divide a frequency band, sound with a less sense of discomfort at listening may be output.

Figure 7:
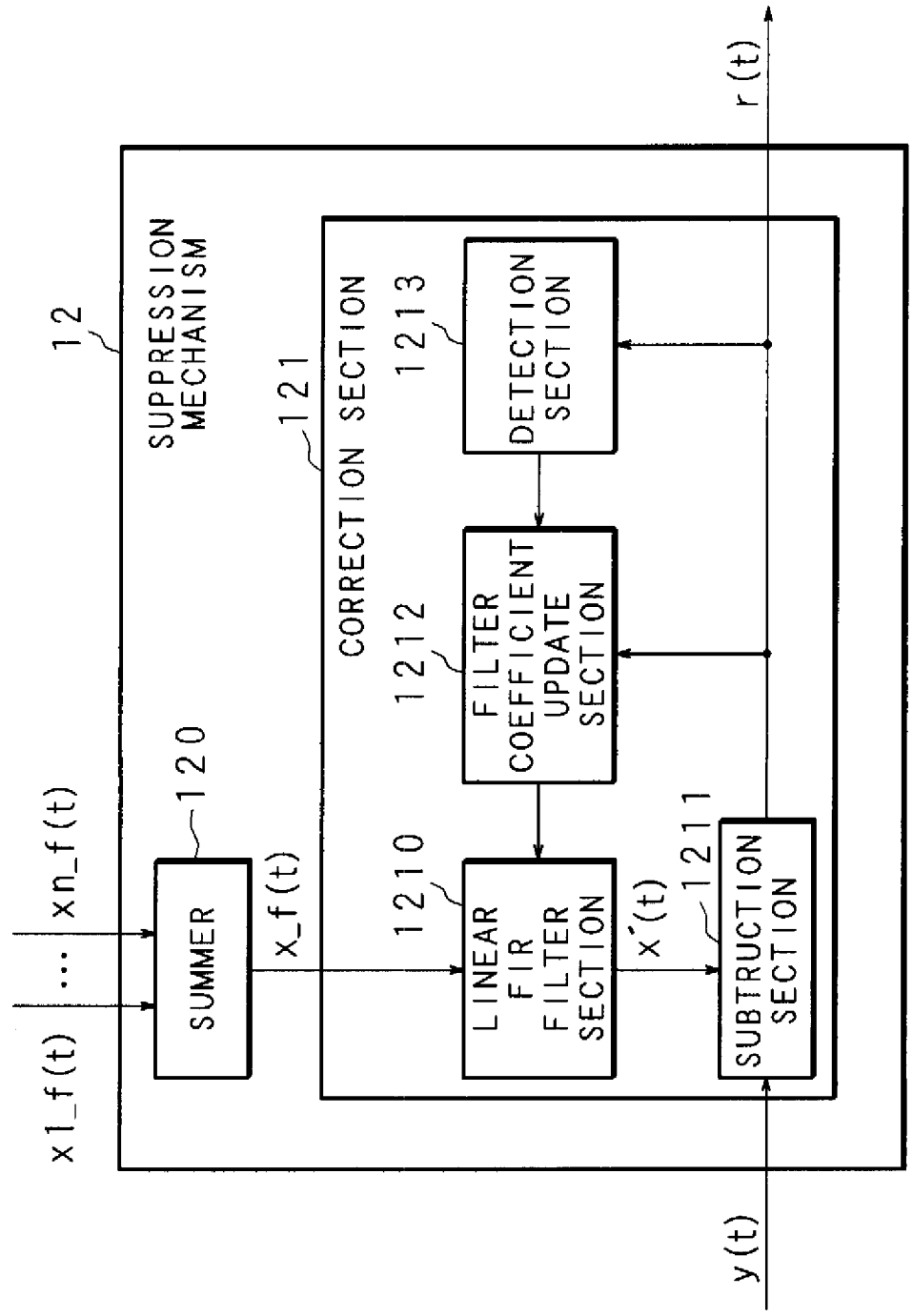
FIG. 7 is a functional block diagram illustrating an example of a suppression mechanism included in the echo suppressor according Embodiment 1.

FIG. 7 is a functional block diagram illustrating an example of the suppression mechanism 12 included in the echo suppressor 1 according Embodiment 1. The suppression mechanism 12 using DSP executes, as described earlier, program modules such as a summer 120 and a correction section 121.

Furthermore, the correction section 121 executes, as sub modules, a linear FIR filter (filter for correction) section 1210 for deriving an echo signal x'(t) as an amount of correction required for correction of an observation sound signal y(t) by filtering a reference sound signal x_f(t) by several hundred times of product-sum operations using a filter coefficient which is required for presumption of echo and is set for each frequency, a subtraction section 1211 for correcting the observation sound signal y(t) by subtracting the echo signal x'(t) from the observation sound signal y(t) and outputting the observation sound signal for which an echo component is suppressed as a suppression result r(t), a filter coefficient update section 1212 for performing calculation and update of a filter coefficient of the linear FIR filter section 1210 by an adaptive processing using the learning identification method based on the observation sound signal after correction, i.e. the suppression result r(t), and the detection section 1213 for detecting the double talk state in which a speaker is talking or the single talk state in which no speaker is talking based on the suppression result r(t). The detection section 1213 then detects the single talk state or the double talk state based on change in intensity of the suppression result r(t), and, if it is in the double talk state, aborts calculation and update of a filter coefficient performed by the filter coefficient update section 1212. It is noted that, in the process performed by the correction section 121, as necessary, framing for the reference sound signal x_f(t) and the observation sound signal y(t), and the FFT process for converting the signals into components on a frequency axis may be performed before the echo suppressing process, and then the IFFT process for converting the signals into components on time axes may be performed to output the suppression result r(t).

Figure 8:
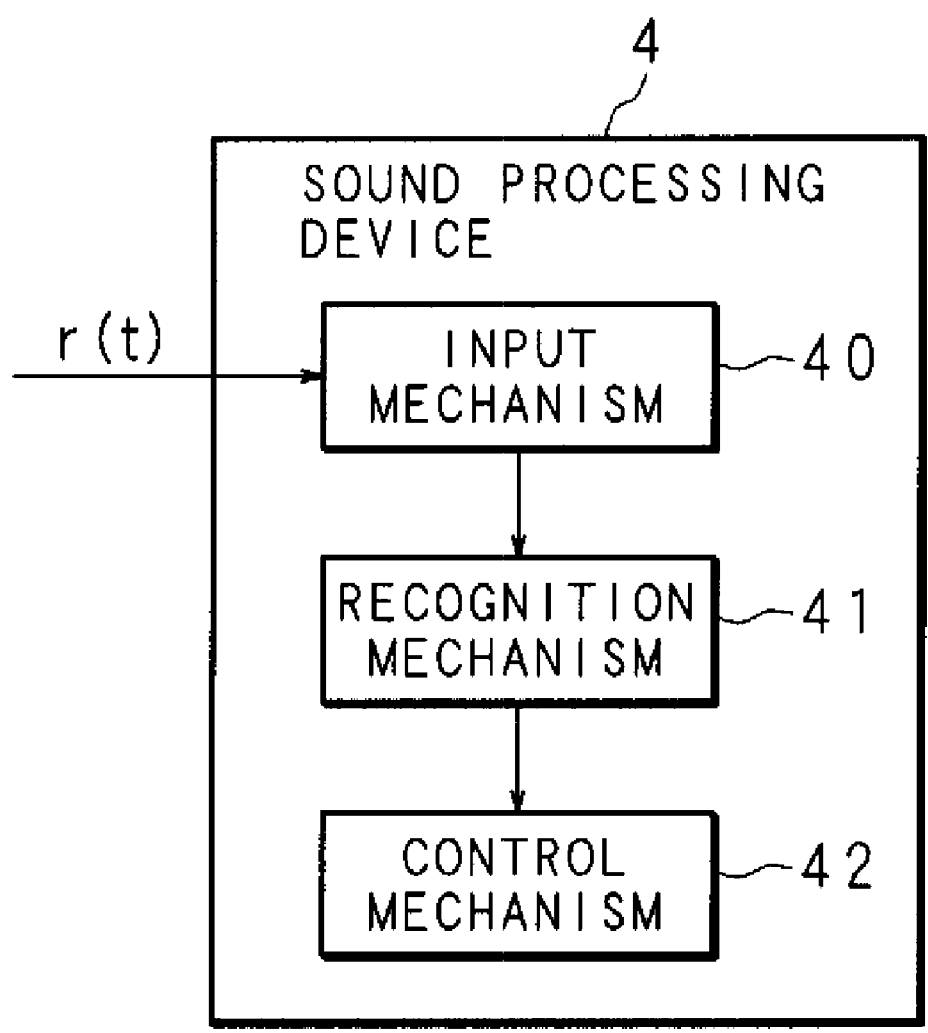
FIG. 8 is a block diagram illustrating an example of a sound processing device according to Embodiment 1.

FIG. 8 is a block diagram illustrating an example of the sound processing device 4 according to Embodiment 1. The sound processing device 4 includes an input mechanism 40 to which the suppression result r(t) output from the output mechanism 13 of the echo suppressor 1 is input, a recognition mechanism 41 for performing a voice recognizing process based on the suppression result r(t) input from the input mechanism 40, and a control mechanism 42 for controlling a navigation process based on the recognized result by the recognition mechanism 41. Control by the control mechanism 42 includes processes primarily performed by a car navigation system, such as input of a destination of a mobile object 5 based on a command recognized from voice uttered by a speaker, derivation of a traveling route and display of the traveling route. When the system of the present embodiment is applied to an audio system, the sound processing device 4 functions as a control device for controlling the echo suppressor 1, the sound output device 2 and the sound input device 3, and the control mechanism 42 controls the echo suppressor 1, the sound output device 2 and the sound input device 3 based on a command by voice uttered by a speaker, e.g. a command such as switch of a sound source, start of playing, end of voice recognition.

Figure 9:
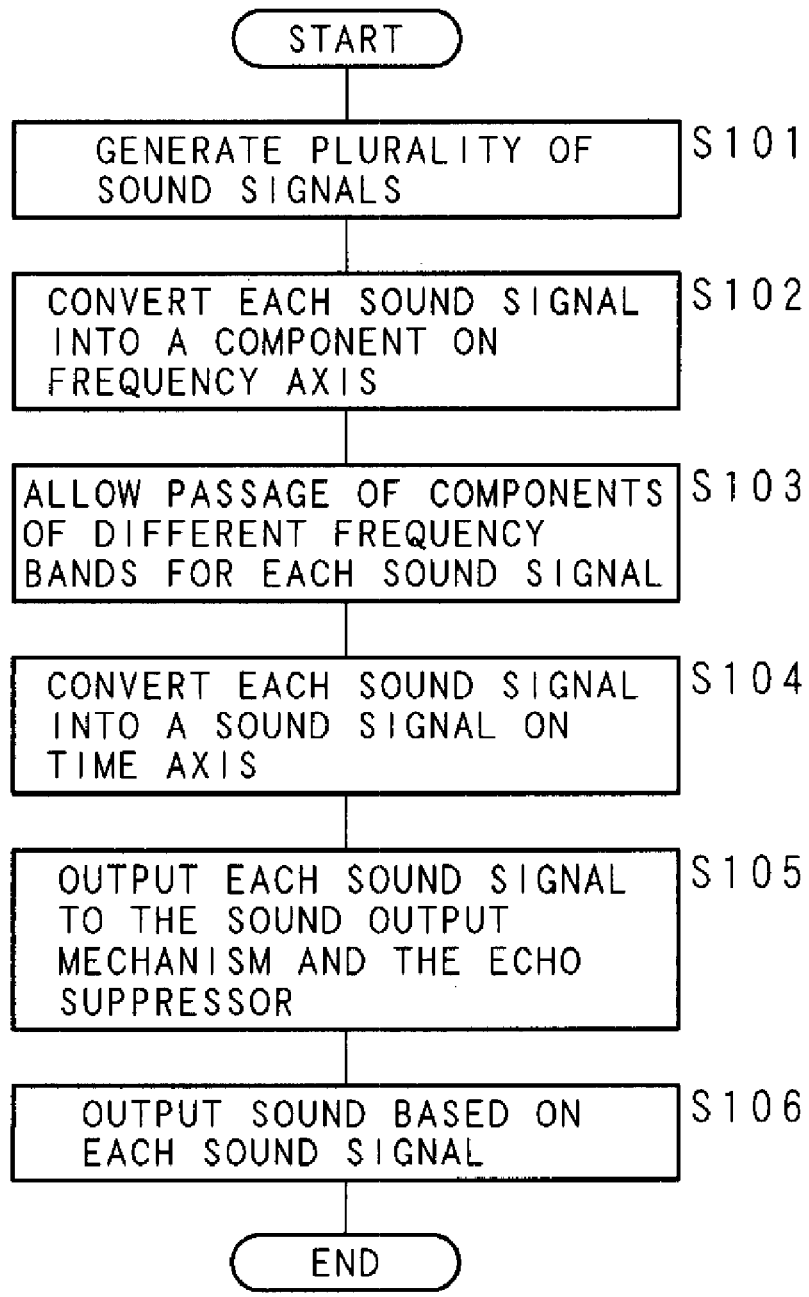
FIG. 9 is an operation chart illustrating an example of the sound output process performed by the sound output device according to Embodiment 1.

Next, the process performed by each of the devices included in the echo suppressing system according to Embodiment 1 is described. FIG. 9 is an operation chart illustrating an example of the sound output process performed by the sound output device 2 according to Embodiment 1. By the sound generation mechanism, the sound output device 2 generates sound signals x1(t), ..., xn(t) of a plurality of channels (at the operation S101), and outputs the generated sound signals x1(t), ..., xn(t) to the passing mechanism 22.

The passing mechanism 22 of the sound output device 2 converts the input sound signals x1(t), ..., xn(t) of a plurality of channels into digital signals, performs a framing process, converts the plurality of sound signals into sound signals $X1(f), \ldots, Xn(f)$ of components on a frequency axis by an FFT process at the FFT sections 220, 220, ... (at the operation S102), and sends the sound signals $X1(f), \ldots, Xn(f)$ converted into components on a frequency axis to the band-pass filter sections 221, 221, ..., respectively. For the method of converting the signals into components on a frequency axis at the operation S102, it is not always necessary to use FFT, while other converting methods such as DCT (Discrete Cosine Transform) may also be used.

In the passing mechanism 22 of the sound output device 2, the band-pass filter sections 221, 221, ... allow passage of components $X1\_f(f), \ldots, Xn\_f(f)$ of different frequency bands for the plurality of sound signals $X1(f), \ldots, Xn(f)$ converted into components on the frequency axis (at the operation S103), and IFFT sections 222, 222, ... converts the signals into sound signals $x1\_f(t), \ldots, xn\_f(t)$ on time axes, respectively, by the IFFT processing (at the operation S104), converts the signals into analog signals to output them to the sound output mechanisms 20, 20, ... and also to the echo suppressor 1 (at the operation S105).

The sound output mechanisms 20, 20, ... in the sound output device 2 output sound based on the input sound signals $x1\_f(t), \ldots, xn\_f(t)$ (at the operation S106).

Figure 10:
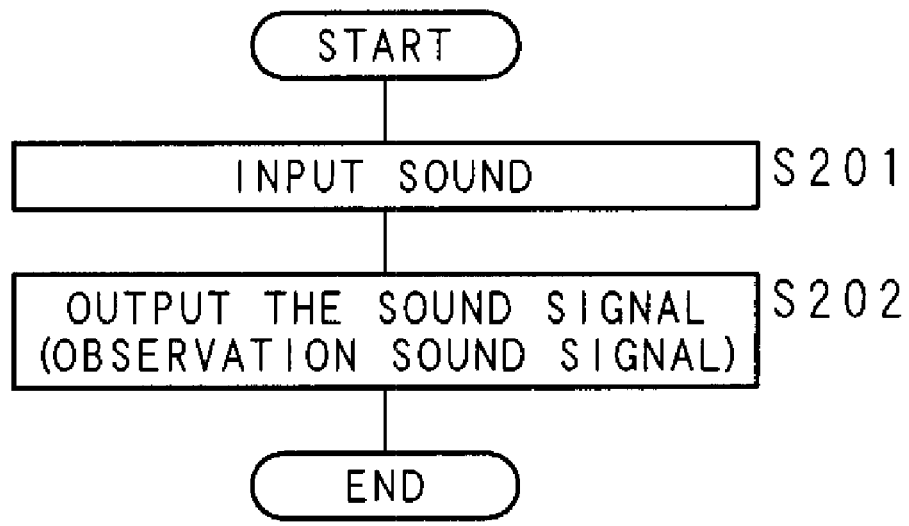
FIG. 10 is an operation chart illustrating an example of the sound input process performed by the sound input device according to Embodiment 1.

FIG. 10 is an operation chart illustrating an example of the sound input process performed by the sound input device 3 according to Embodiment 1. The sound input device 3 inputs sound by the sound input mechanism 30 (at the operation S201), generates a sound signal based on the input sound, and outputs the generated sound signal to the echo suppressor 1 as the observation sound signal y(t) (at the operation S202). At the operation S201, to the sound input device 3, sound from an acoustic filed from which the sound output device 2 outputs sound is input. Thus, the sound output from the sound output device 2 may be mixed in the sound input to the sound input device 3.

Figure 11:
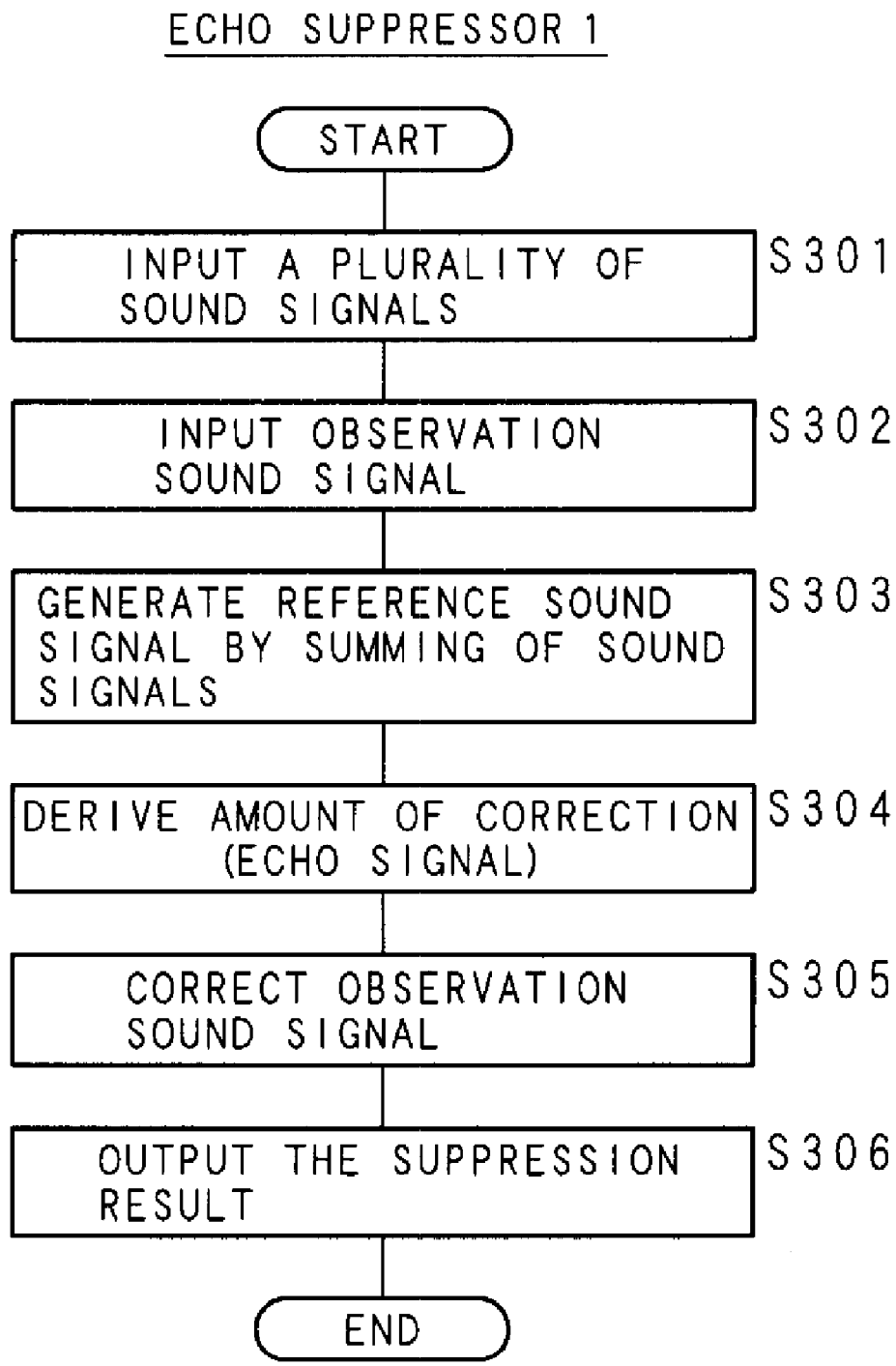
FIG. 11 is an operation chart illustrating an example of the echo suppressing process performed by the echo suppressor according to Embodiment 1.

FIG. 11 is an operation chart illustrating an example of the echo suppressing process performed by the echo suppressor 1 according to Embodiment 1. The echo suppressor 1 inputs, by the first input mechanism 10, sound signals $x1\_(f), \ldots, xn\_f(t)$ of a plurality of channels output from the sound output device 2 (at the operation S301), converts the input sound signals $x1\_f(t), \ldots, xn\_f(t)$ into digital signals to send them to the suppression mechanism 12, inputs, by the second input mechanism 11, the observation sound signal y(t) output from the sound input device 3 (at the operation S302), and converts the input observation sound signal y(t) into a digital signal to send it to the suppression mechanism 12. It is noted that the processes at the operation S301 and the operation S302 are practically performed in parallel.

The suppression mechanism 12 in the echo suppressor 1 sums, by the summer 120, the sound signals $x1\_f(t), \ldots, xn\_f(t)$ of a plurality of channels output from the sound output device 2 to generate a reference sound signal $x\_f(x)$ (at the operation S303), and sends the generated reference sound signal $x\_f(x)$ to the correction section 121.

As a process performed by the correction section 121, the suppression mechanism 12 in the echo suppressor 1 derives an echo signal x'(t) as an amount of correction required for correcting the observation sound signal y(t) by filtering the reference sound signal $x\_f(x)$ by a product-sum operation at the linear FIR filter section 1210 using a preset filter coefficient (at the operation S304), and sends the derived echo signal x'(t), i.e. the amount of correction, to the subtraction section 1211.

As a process performed by the correction section 121, the suppression mechanism 12 in the echo suppressor 1 corrects the observation sound signal y(t) by subtracting the echo signal x'(t) from the observation sound signal y(t) by the subtraction section 1211 (at the operation S305), converts the suppression result r(t) which is the corrected observation sound signal y(t) into an analog signal, and outputs the converted suppression result r(t) to the sound processing device 4 (at the operation S306). The sound processing device 4 then executes a process such as voice recognition based on the input suppression result r(t).

Figure 12:
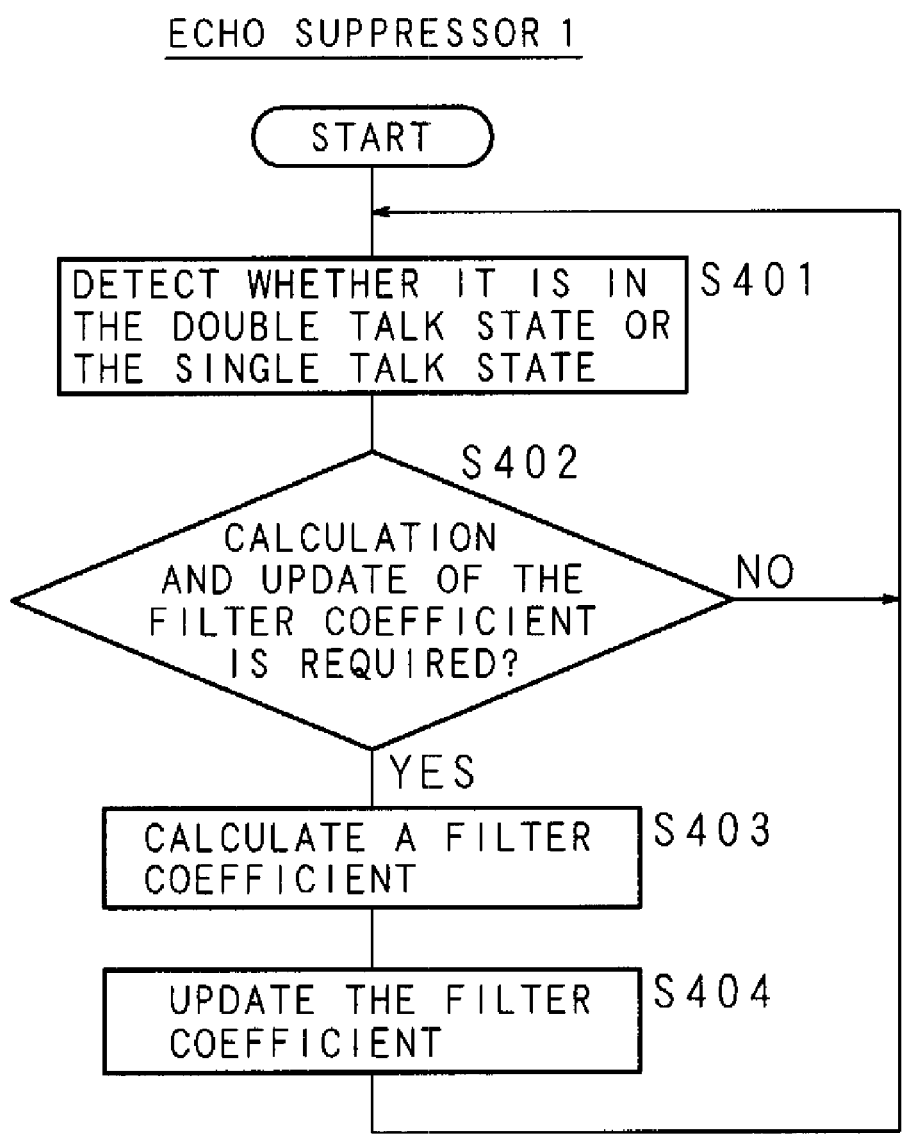
FIG. 12 is an operation chart illustrating an example of the filter coefficient update process performed by the echo suppressor according to Embodiment 1.

FIG. 12 is an operation chart illustrating an example of the filter coefficient update process performed by the echo suppressor 1 according to Embodiment 1. The echo suppressor 1 executes, in parallel with the echo suppressing process illustrated in FIG. 11, a update process for the filter coefficient used to derive an echo signal. As a process performed by the correction section 121, the suppression mechanism 12 of the echo suppressor 1 detects whether it is in the double talk state in which a speaker is talking or the single talk state in which no speaker is talking by the detection section 1213 based on the suppression result r(t) output from the subtraction section 1211 (at the operation S401), and sends the detection result indicating the detected result to the filter coefficient update section 1212.

As the process performed by the correction section 121, the suppression mechanism 12 of the echo suppressor 1 determines, by the filter coefficient update section 1212, if calculation and update of the filter coefficient is required based on the detection result received from the detection section 1213 (at the operation S402). At the operation S402, calculation and update of the filter coefficient are executed if the detection result indicates the single talk, whereas calculation and update of the filter coefficient are aborted if it indicates the double talk.

At the operation S402, if it is determined that calculation and update of the filter coefficient is required (at the operation S402:YES), as the process performed by the correction section 121, the suppression mechanism 12 of the echo suppressor 1 calculates, by the filter coefficient update section 1212, a filter coefficient by an adaptive processing using the learning identification method based on the suppression result r(t) output from the subtraction section 1211 (at the operation S403), updates the filter coefficient used at the linear FIR filter section 1210 to the filter coefficient calculated at the step S403 (at the operation S404), returns to the operation S401, and repeats the subsequent processes.

At the operation S402, if it is determined that calculation and update are not required (at the operation S402:NO), as the process performed by the correction section 121, the suppression mechanism 12 of the echo suppressor 1 does not perform calculation and update of the filter coefficient by the filter coefficient update section 1212, returns to the operation S401, and repeats the subsequent processes.

When sound of a plurality of channels is output from the sound output device 2 to an acoustic field, a sound signal input from the acoustic field includes echo based on the sound output from the sound output device 2. If the acoustic field keeps its linearity to sound, the sound output from the sound output device 2 is input to the sound input device 3 while maintaining the frequency. Moreover, since the reference sound signal $x\_f(t)$ is a signal obtained by summing the sound signals $x1\_f(t), \ldots, xn\_f(t)$ of a plurality of channels to which different frequency bands are respectively allocated, at an arbitrary frequency f, the relationship between the reference sound signal $x\_f(t)$ and the observation sound signal y(t) is regarded as equal to their relationship when sound of one channel is output. Hence, the echo suppressing system of the present embodiment is able to suppress echo at accuracy equal to the case where a sound signal of one channel is output, even when sound signals of a plurality of channels are output.

The present embodiment discloses the technique described below. A component of a different frequency band passes through for each of a plurality of sound signals of, for example, a multichannel audio apparatus, and sound based on each of the plurality of sound signals for which a component of a different frequency band passed through is output from each of a plurality of sound output sections such as loudspeakers. The sound input device including a sound input section such as a microphone converts the input sound into a sound signal. The echo suppressor then corrects an observation sound signal so as to suppress echo included in the observation sound signal based on the reference sound signal obtained by summing a plurality of sound signals including components of different frequency bands and the observed sound signal which is a sound signal input from the sound input device.

In the present embodiment, a different sound signal is assigned to each frequency, so that only echo from one path based on one sound signal is included for an arbitrary frequency of the observation sound signal. Thus, the linearity in that an arbitrary frequency of the output sound affects only on the same frequency as the input sound is utilized to increase the presumption accuracy of echo, so that residual echo may be suppressed, presenting a beneficial effect. Moreover, in the present embodiment, there is no need to provide a correction section for suppressing echo for each of a plurality of sound signals because one correction section is enough to suppress echo from a plurality of sound signals, so that increase in cost and device size associated with installment of additional correction sections may be prevented, presenting a beneficial effect.

Embodiment 2

Embodiment 2 is an example where, in Embodiment 1, a processed sound signal obtained by processing an original sound signal using a given method is used to realize efficient filtering for sound signals of a plurality of channels. In Embodiment 2, an example is described where the present embodiment is applied to a pseudo 5-channel stereo system with a first sound signal of L (Left) channel, a second sound signal of R (Right) channel, a chord signal of C (Center) channel which is the sum of the first sound signal and the second sound signal, a delayed first sound signal of sL (at the operation Surround Left) channel which is obtained by delaying the first sound signal by a given time, and a delayed second sound signal of sR (at the operation Surround Right) channel which is obtained by delaying the second sound signal by a given time. In the pseudo 5 channels, the first sound signal and the second sound signal are original signals, while the chord signal, the delayed first sound signal and the delayed second sound signal are processed sound signals, each of which is obtained by processing an original sound signal by summing or delaying. The echo suppressing system according to Embodiment 2, however, is not limited to the pseudo 5 channels, but other various forms may also be employed such as an example where a pseudo 4-channel stereo system including the first sound signal, the second sound signal, the delayed first signal and the delayed second signal is used, and an example where a delayed chord signal obtained by delaying the chord signal is used as a pseudo signal.

In the description below, the parts similar to those in Embodiment 1 are denoted by reference codes similar to those in Embodiment 1 and will not be described in detail. Since the configuration example of the echo suppressing system in Embodiment 2 is similar to that in Embodiment 1 described with reference to FIG. 4, reference shall be made to Embodiment 1 and description thereof will not be repeated.

Figure 13:
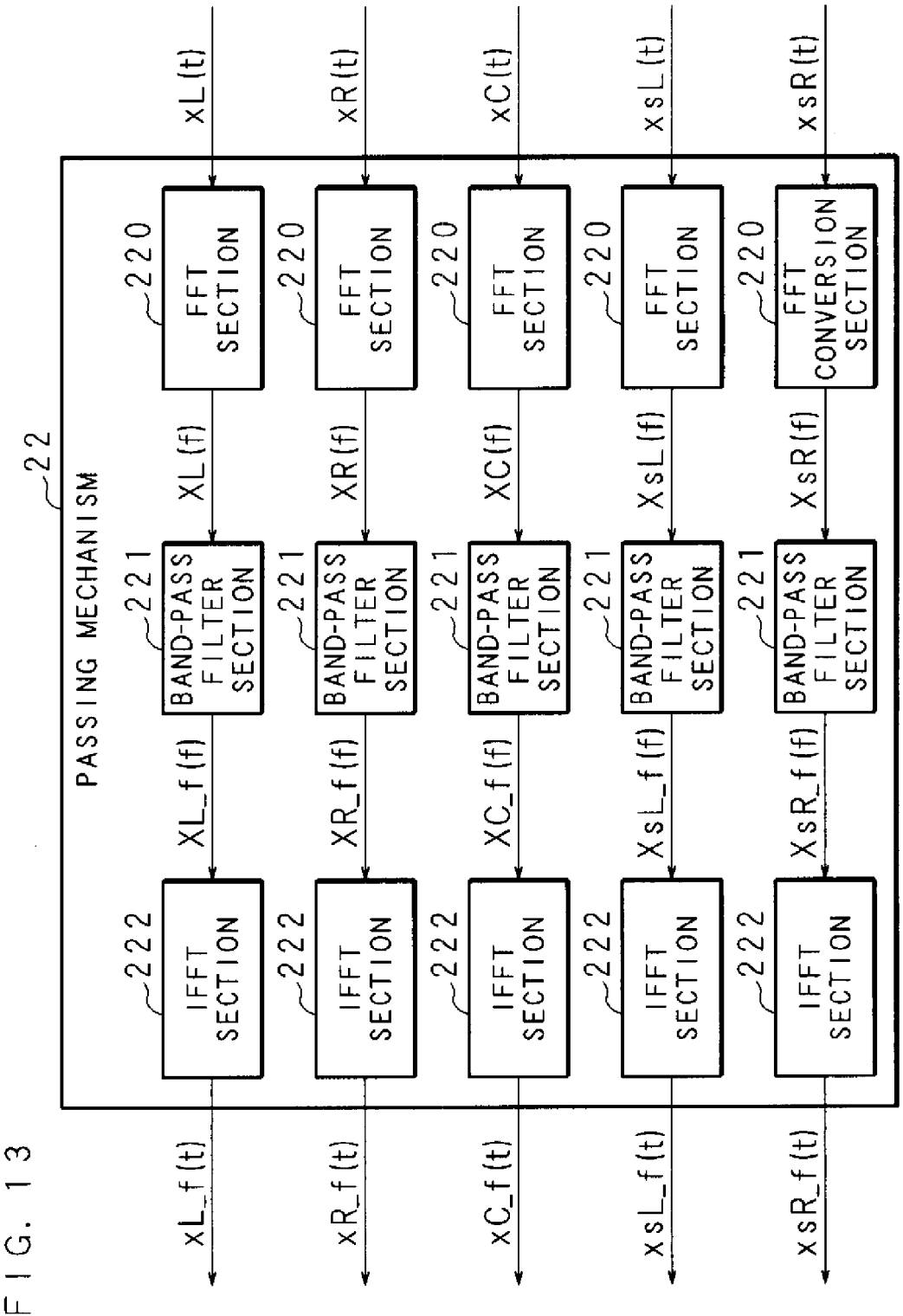
FIG. 13 is a functional block diagram illustrating an example of the passing mechanism of the sound output device according to Embodiment 2.

FIG. 13 is a functional block diagram illustrating an example of the passing mechanism 22 of the sound output device 2 according to Embodiment 2. The passing mechanism 22 in the sound output device 2 according to Embodiment 2 is substantially similar to that in Embodiment 1. In FIG. 13, xL(t), xR(t), xC(t), xsL(t) and xsR(t) denote the first sound signal, the second sound signal, the chord signal, the delayed first sound signal and the delayed second sound signal that are input to the FFT sections 220, 220, . . . , respectively. Moreover, the sound signals xL(t), xR(t), xC(t), xsL(t) and xsR(t) are converted into components on a frequency axis by the FFT sections 220, 220, . . . , to obtain sound signals XL(f), XR(f), XC(f), XsL(f) and XsR(f). Furthermore, the sound signals XL(f), XR(f), XC(f), XsL(f) and XsR(f) converted into components on a frequency axis pass through the band-pass filter sections 221, 221, . . . , respectively, to obtain sound signals XL_f(f), XR_f(f), XC_f(f), XsL_f(f) and XsR_f(f). The sound signals XL_f(f), XR_f(f), XC_f(f), XsL_f(f) and XsR_f(f) are further converted into sound signals on time axes by the IFFT sections 222, 222, . . . to obtain xL_f(t), xR_f(t), xC_f(t), xsL_f(t) and xsR_f(t).

FIGS. 14A-14E are graphic charts, each illustrating a filter coefficient of the band-pass filter section 221 of the passing mechanism 22 included in the sound output device 2 according to Embodiment 2. FIGS. 14A, 14B, 14C, 14D and 14E illustrate, respectively, coefficient filters CL(f), CR(f), CC(f), CsL(f) and CsR(f) for the L-channel first sound signal XL(f), the R-channel second sound signal XR(f), the C-channel chord singal XC(f), the sL-channel delayed first sound signal XsL(f) and sR-channel delayed second sound signal XsR(f), each of which representing the relationship between frequency f indicated on the horizontal axis and a filter coefficient indicated on the vertical axis.

The coefficient filter CL(f) for the first sound signal XL(f) indicated in FIG. 14A and the coefficient filter CR(f) for the second sound signal XR(f) indicated in FIG. 14B are filters set to allow passage of components of different frequency bands. Since the chord signal XC(f) is a sound signal obtained by summing the first sound signal XL(f) and the second sound signal XR(f), the coefficient filter CC(f) illustrated in FIG. 14C, which is the sum of the coefficient filter CL(f) for the first sound signal XL(f) and the coefficient filter CR(f) for the second sound signal XR(f), is used for the chord signal XC(f). In the example illustrated as Embodiment 2, the coefficient filter CC(f) is a filter for allowing passage of components of all frequency bands to be filtered, the filter coefficient being 1.0 regardless of frequency. Moreover, the delayed first sound signal XsL(f) is a sound signal obtained by delaying the first sound signal XL(f), so that the coefficient filter CsL(f) indicated in FIG. 14D, which is obtained by diverting (copying) the coefficient filter CL(f) for the first sound signal XL(f), is used for the delayed first sound signal XsL(f). Hence, the coefficient filter CL(f) for the first sound signal XL(f) is the same filter as the coefficient filter CsL(f) for the delayed first sound signal XsL(f). Furthermore, the delayed second sound signal XsR(f) is a sound signal obtained by delaying the second sound signal XR(f), so that the coefficient filter CsR(f) indicated in FIG. 14E, which is obtained by diverting (copying) the coefficient filter CR(f) for the second sound signal XR(f) is used for the delayed second sound signal XsR(f).

Hence, the coefficient filter CR(f) for the second sound signal XR(f) is a filter with the same filter coefficient as the coefficient filter CsR(f) for the delayed second sound signal XsR(f).

As described above, in Embodiment 2, the band-pass filter sections 221, 221, ... process signals of five channels, so that it is constituted by a memory for storing signals of five channels and program modules for filtering. For the filter coefficient used in each of the program modules, a uniquely-set filter coefficient is used for each of the first sound signal XL(f) and the second sound signal XR(f). Moreover, for the chord signal XC(f), a filter coefficient calculated as the sum of the filter coefficient for the first sound signal XL(f) and the filter coefficient for the second sound signal XR(f) is used. Furthermore, a filter coefficient copied from the filter coefficient for the first sound signal XL(f) is used for the delayed first sound signal XsL(f), while the filter coefficient copied from the filter coefficient for the second sound signal XR(f) is used for the delayed second sound signal XsR(f). It is also possible that, for the program module performing a filtering process for each channel, one program module may be used by time sharing and a filter coefficient may be set for every signal.

Other sections and processes are similar to those in Embodiment 1, reference shall be made to Embodiment 1 and description thereof will not be repeated here.

The present embodiment further discloses a technique of assigning frequency bands in which, when processed sound signals obtained by processing the first sound signal, the second sound signal and the first sound signal and/or the second sound signal by a given processing method are used, in realizing a pseudo 5-channel stereo using processed sound signals such as a chord signal based on the sum of the first sound signal and the second sound signal, a delayed first sound signal obtained by delaying the first sound signal by a given time and a delayed second sound signal obtained by delaying the second sound signal when, for example, the first sound signal and the second sound signal are 2-channel stereo signals, the first filter coefficient used for the first sound signal and the second filter coefficient used for the second sound signal are diverted for the processed sound signals to perform assignment of frequency bands.

In the present embodiment, a process to be performed for three or more types of sound signals by two types of filters, so that resources of the sound output device may efficiently be utilized, presenting a beneficial effect.

Embodiment 3

Embodiment 3 is an example where, in Embodiment 1, for sound signals of a plurality of channels generated by a sound signal generating mechanism, a component of a frequency band corresponding to a preset removal band such as a frequency band corresponding to voice uttered by a person does not pass through for any sound signal, and the double talk or the single talk is detected based on the component of the frequency band corresponding to the removal band.

In the description below, parts similar to those in Embodiment 1 are denoted by reference codes similar to those in Embodiment 1, and will not be described in detail. Since the configuration example of the echo suppressing system in Embodiment 3 is similar to that of Embodiment 1 illustrated in FIG. 4, reference shall be made to Embodiment 1 and description thereof will not be repeated here.

Figure 15:
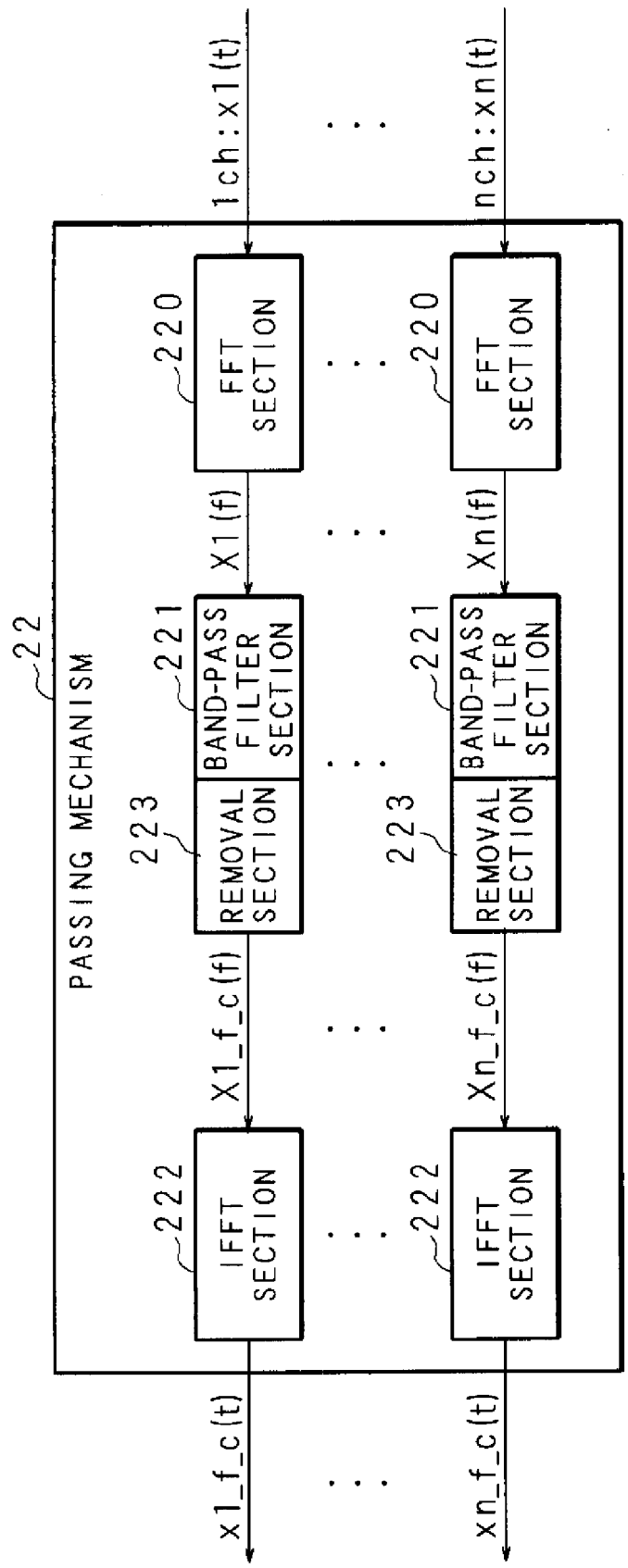
FIG. 15 is a functional block diagram illustrating an example of the passing mechanism of the sound output device according to Embodiment 3.

FIG. 15 is a functional block diagram illustrating an example of the passing mechanism 22 of the sound output device 2 according to Embodiment 3. The passing mechanism 22 according to Embodiment 3 includes removal sections 223, 223, ..., each of which removes a component of a frequency band corresponding to a preset removal band f_cut. The removal sections 223, 223, ... remove a component of a frequency band corresponding to the removal band f_cut from a plurality of sound signals X1(f), ..., Xn_f(f) which passed through the band-pass filter sections 221, 221, ... and are converted into components on a frequency axis, and outputs signals X1_f_c(f), ..., Xn_f_c(f), from which the component of the removal band f_cut is removed, to the IFFT sections 222, 222, .... The IFFT sections 222, 222, ... convert the plurality of sound signals X1_f_c(f), ..., Xn_f_c(f) which passed through the removal sections 223, 223, ... into sound signals x1_f_c(t), ..., xn_f_c(t) on time axes, respectively, by the IFFT process. The IFFT sections 222, 222, ... output sound signals x1_f_c(t), ..., xn_f_c(t) to the sound output mechanisms 20, 20, ... associated with the channels, and to the echo suppressor 1.

Figure 16:
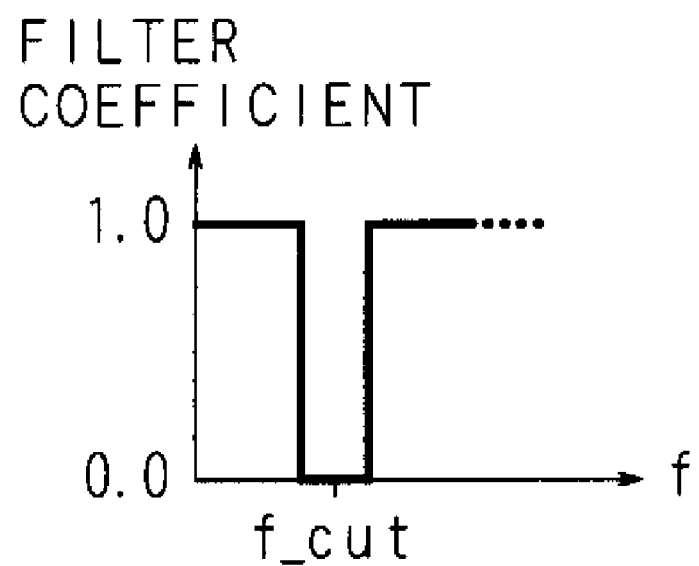
FIG. 16 is a graphic chart illustrating a filter coefficient of a removal section of the passing mechanism included in the sound output device according to Embodiment 3.

FIG. 16 is a graphic chart illustrating a filter coefficient of the removal section 223 of the passing mechanism 22 included in the sound output device 2 according to Embodiment 3. FIG. 16 is a graph illustrating a removal coefficient filter CCUT(f), and representing the relationship between frequency indicated on the horizontal axis and a filter coefficient indicated on the vertical axis. As illustrated in FIG. 16, for the removal coefficient filter CCUT(f), the filter coefficient is 0.0 for the removal band f_cut corresponding to a person's voice, while it is 1.0 for the other bands. As such, the sound output device 2 according to Embodiment 3 removes a frequency component corresponding to the removal band f_cut from the sound of all channels to be output by setting the removal band f_cut. It is noted that, instead of providing the removal section 223, each of the band-pass filter sections 221, 221, ... may set a filter coefficient for each of the band-pass filter sections 221, 221, ... such that a component of the frequency corresponding to the removal band f_cut is blocked.

Figure 17:
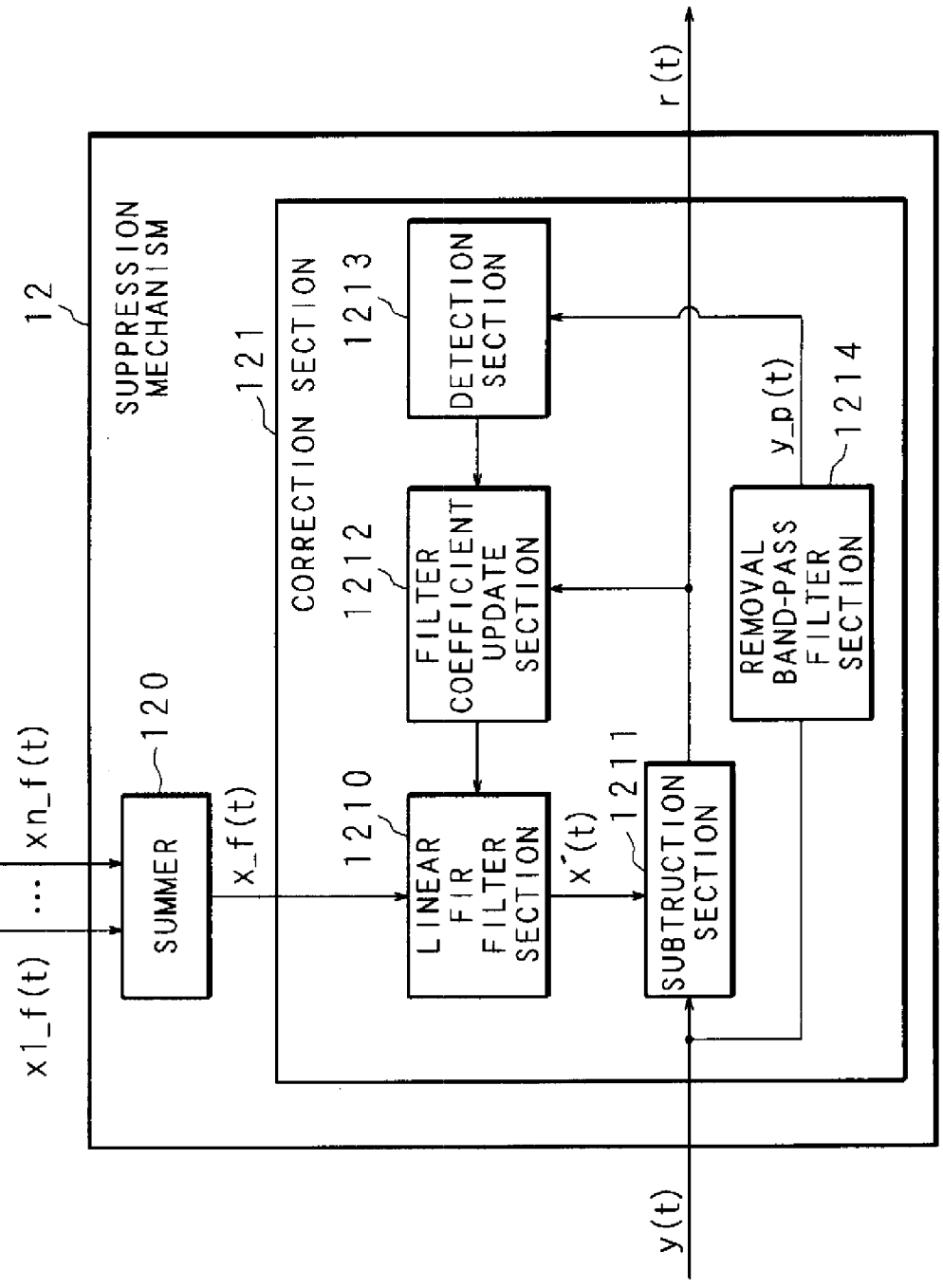
FIG. 17 is a functional block diagram illustrating an example of the suppression mechanism included in the echo suppressor according to Embodiment 3.

FIG. 17 is a functional block diagram illustrating an example of the suppression mechanism 12 included in the echo suppressor 1 according to Embodiment 3. The correction section 121 of the suppression mechanism 12 according to Embodiment 3 executes, as a sub module, a removal band-pass filter section 1214 which allows passage of only a frequency component corresponding to the removal band f_cut from the observation sound signal y(t). The detection section 1213 then detects whether it is in the single talk state or the double talk state based on an observation sound signal for detection y_p(t) which passed through the removal band-pass filter section 1214. If the acoustic field in which the sound output device 2 outputs sound of a plurality of channels maintains a linearity to the sound, it is assumed that no echo component based on the output sound is included in the removal band f_cut for the observation sound signal y(t). Hence, when the single talk state or the double talk state is detected based on the observation sound signal for detection y_p(t) which allowed passage of only the component of the removal band f_cut, the state may be detected with higher accuracy compared to the case where the detection is performed based on the suppression result r(t) as described in Embodiment 1.

Figure 18:
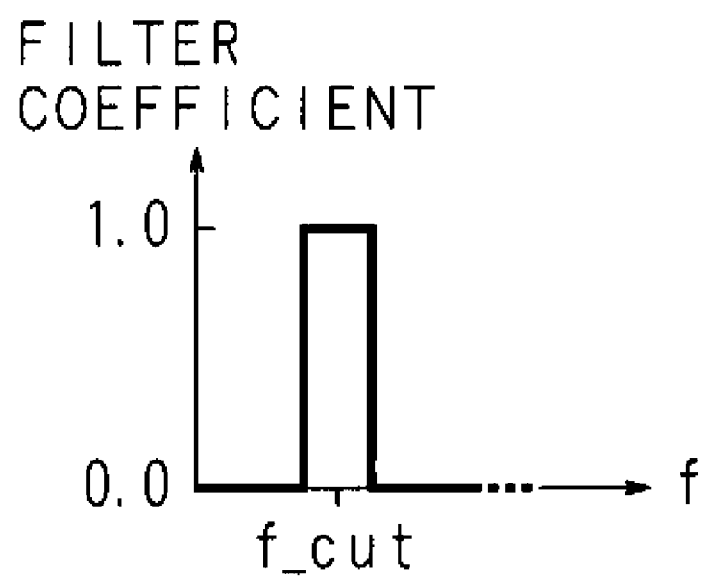
FIG. 18 is a graphic chart illustrating a filter coefficient of a removal band-pass filter section of the suppression mechanism included in the echo suppressor according to Embodiment 3.

FIG. 18 is a graphic chart illustrating a filter coefficient of the removal band-pass filter section 1214 of the suppression mechanism 12 included in the echo suppressor 1 according to Embodiment 3. FIG. 18 illustrates a removal band-pass coefficient filter CPASS(f) which is set for the removal band-pass filter section 1214, representing the relationship between frequency indicated on the horizontal axis and a filter coefficient indicated on the vertical axis. As illustrated in FIG. 18, for the removal band-pass coefficient filter CPASS(f), the filter coefficient is 1.0 in the removal band f_cut, while it is 0.0 in the other bands. As such, the removal band-pass filter section 1214 according to Embodiment 3 allows passage of only a frequency component corresponding to the removal band f_cut from the observation sound signal y(t).

Figure 19:
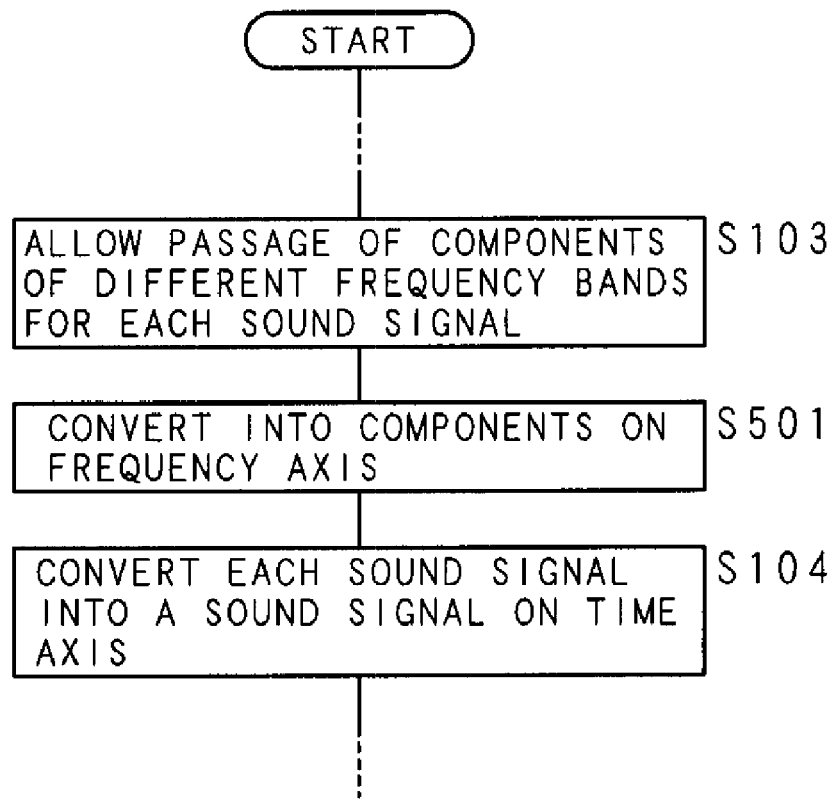
FIG. 19 is an operation chart illustrating an example of the sound output process performed by the sound output device according to Embodiment 3.

Next, processes performed by devices included in the echo suppressing system according to Embodiment 3 are described. FIG. 19 is an operation chart illustrating an example of the sound output process performed by the sound output device 2 according to Embodiment 3. In Embodiment 3, after execution of processes at the operations S101 to S103 indicated in the operation chart for the sound output process according to Embodiment 1, the removal section 223 in the passing mechanism 22 executes the process of removing a frequency component corresponding to the removal band f_cut.

The sound output device 2 executes processes at the operations S101 to S103 described in Embodiment 1. The passing mechanism 22 in the sound output device 2 removes, by the removal section 223, a component of a frequency band corresponding to the removal band f_cut from a plurality of sound signals) X1_f(f), . . . , Xn_f(f) that passed through the band-pass filter sections 221, 221, . . . and are converted into components on a frequency axis (at the operation S501), and outputs signals X1_f_c(f), . . . , Xn_f_c(f) from which the component of the removal band f_cut is removed to the IFFT sections 222, 222, . . . . The sound output device 2 executes the processes from the step s104 on, which were described in the sound output process in Embodiment 1.

Since the sound input process performed by the sound input device 3 and the echo suppressing process performed by the echo suppressor 1 according to Embodiment 3 are similar to those in Embodiment 1, reference shall be made to Embodiment 1 and description thereof will not be repeated here. Note that, in the echo suppressing process, the summer 120 of the suppression mechanism 12 adds up sound signals x1_f_c(t), . . . , xn_f_c(t) of a plurality of channels from which a component of the removal band f_cut is removed, to generate a generation sound signal x_f'(x).

Figure 20:
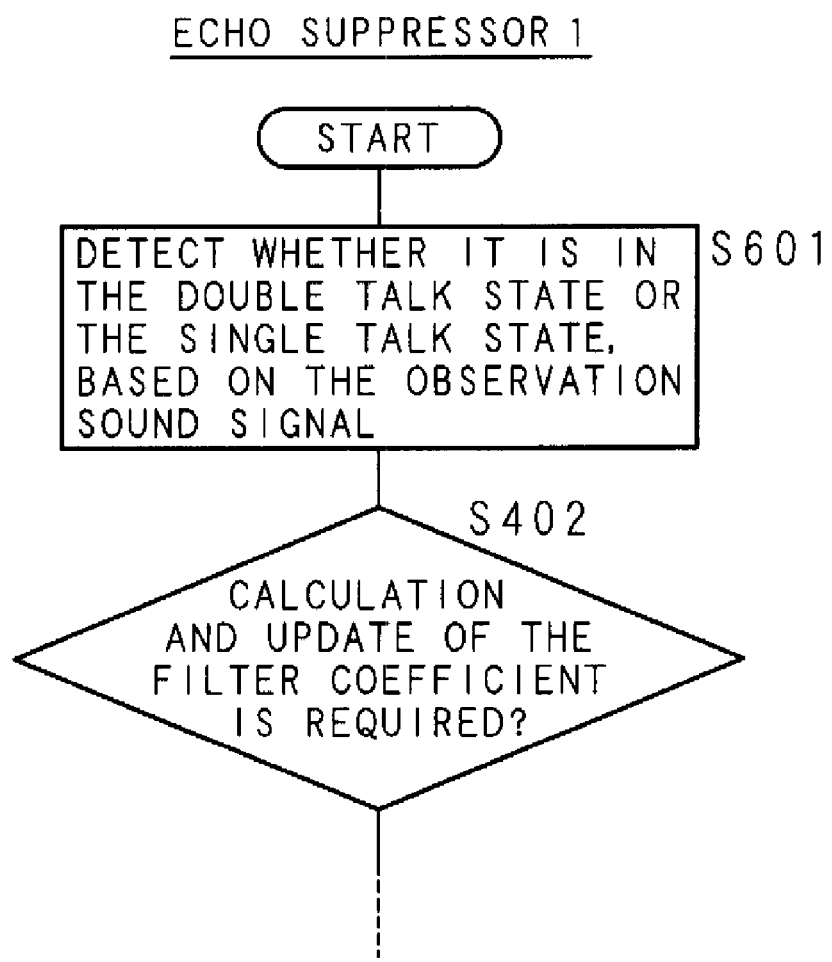
FIG. 20 is an operation chart illustrating an example of the filter coefficient update process of the echo suppressor according to Embodiment 3.

FIG. 20 is an operation chart illustrating an example of the filter coefficient update process of the echo suppressor 1 according to Embodiment 3. As a process performed by the correction section 121, the suppression mechanism 12 of the echo suppressor 1 detects, by the detection section 1213, whether it is in the double talk state in which a speaker is talking or the single talk state in which no speaker is talking, based on the observation sound signal for detection y_p(t) which passed through the removal band-pass filter section 1214 (at the operation S601), and sends a detection result indicating the detected result to the filter coefficient update section 1212. The echo suppressor 1 then executes the processes from the operation S402 on described in the filter coefficient update process in Embodiment 1.

The present embodiment further discloses the technique described below. In the sound output device, for example, a frequency band corresponding to a person's voice is preset as a removal band, and the device prohibits to allow passage of a component of a frequency band corresponding to the removal band for any sound signals. The echo suppressor then detects if it is in the double talk state in which a speaker is talking or the single talk state in which no speaker is talking, based on a component of the removal band for the observation sound signal. If it is determined as the single talk state, the echo suppressor performs filtering by a filter coefficient set for each frequency to perform calculation and update of a filter coefficient of the correction filter section which derives the amount of correction required for correction of the observed sound signal. If it is determined as the double talk state, update of the filter coefficient is aborted.

In the present embodiment, recognition accuracy in a zone including voice and hence the voice recognition accuracy, presenting a beneficial effect.

Embodiment 4

Embodiment 4 is an example where, in Embodiment 1, the echo suppressing method is executed only when a given operation such as pressing of a talking switch of a car navigation system is performed. In the description below, configuration parts similar to those in Embodiment 1 are denoted by reference codes similar to those in Embodiment 1, and will not be described in detail.

Figure 21:
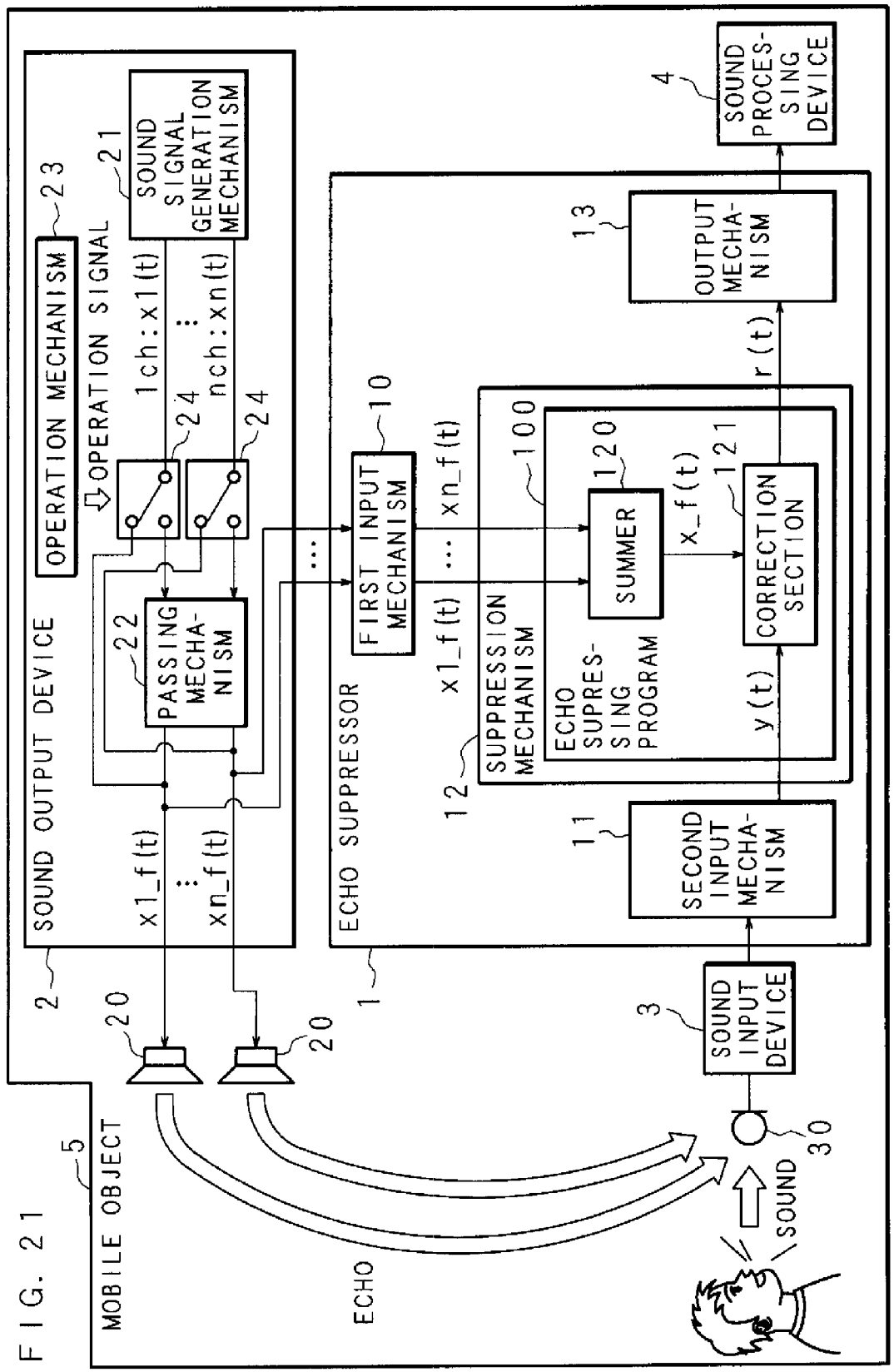
FIG. 21 is a block diagram schematically illustrating an example of the echo suppressing system according to Embodiment 4.

FIG. 21 is a block diagram schematically illustrating an example of the echo suppressing system according to Embodiment 4. The sound output device 2 according to Embodiment 4 includes an operation mechanism 23 for functioning as a talking switch and switching mechanisms 24, 24, . . . such as a switch for switching a signal path based on the operation by the operation mechanism 23. The switching mechanisms 24, 24, . . . are arranged on signal lines transmitting sound signals of a plurality of channels from the sound signal generation mechanism 21 to the passing mechanism 22, and output the sound signals of a plurality of channels output from the sound signal generation mechanism 21 to the passing mechanism 22 or to a plurality of sound output mechanisms 20, 20, . . . .

When a speaker performs an operation such as pressing the operation mechanism 23, the operation mechanism 23 outputs an operation signal to each of the switching mechanisms 24, 24, . . . , and the switching mechanisms 24, 24, . . . performs a switching process of a signal path such that the sound signals of a plurality of channels output from the sound signal generation mechanism 21 are output while the operation signal is being input or for a certain period of time after the input of the operation signal. While the sound signals of a plurality of channels are being output to the passing mechanism 22, the echo suppressing system performs various processes described in Embodiment 1.

When a speaker is not performing an operation for the operation mechanism 23, or when a certain period of time has passed from the operation, the switching mechanisms 24, 24, . . . set signal paths such that the sound signals of a plurality of channels output from the sound signal generation mechanism 21 are output to the sound output mechanisms 20, 20, . . . .

Accordingly, in Embodiment 4, the echo suppressing method is executed only when a speaker performs an operation. In normal times when no operation is performed, the sound signals of a plurality of channels output from the sound signal generation mechanism 21 are output to the sound output mechanisms 20, 20, . . . as they are and thus no selection is made for passage of a frequency component of a sound signal, allowing the sound quality of output sound to be maintained.

Since the other sections and processes are similar to those in Embodiment 1, reference shall be made to Embodiment 1 and description thereof will not be repeated here.

The present embodiment further discloses a technique such that, amplitude of a plurality of sound signals is compared with one another by a given method, and all sound signals or only one sound signal with the maximum amplitude may be passed through for a frequency band determined that a value indicating the comparison result obtained by comparing the amplitude of one sound signal having a maximum amplitude with the amplitude of all the other sound signals is equal to or larger than a given value.

In the present embodiment, when the amplitude of one sound signal is equal to or larger than a given value compared to the amplitude of the other sound signals, such as, for example, solo playing in an orchestra, one sound signal is prevented from being blocked at the passing section, so that sound without a sense of discomfort may be output, presenting a beneficial effect.

Embodiment 5

Embodiment 5 describes an example where, in Embodiment 1, the process performed by the passing mechanism is dynamically changed based on the correlation among sound signals.

In the description below, configuration parts similar to those in Embodiment 1 are denoted by reference codes similar to those in Embodiment 1 and will not be described in detail. Since the configuration example of the echo suppressing system in Embodiment 5 is similar to that of Embodiment 1 described with reference to FIG. 4, reference shall be made to Embodiment 1 and description thereof will not be repeated here.

Figure 22:
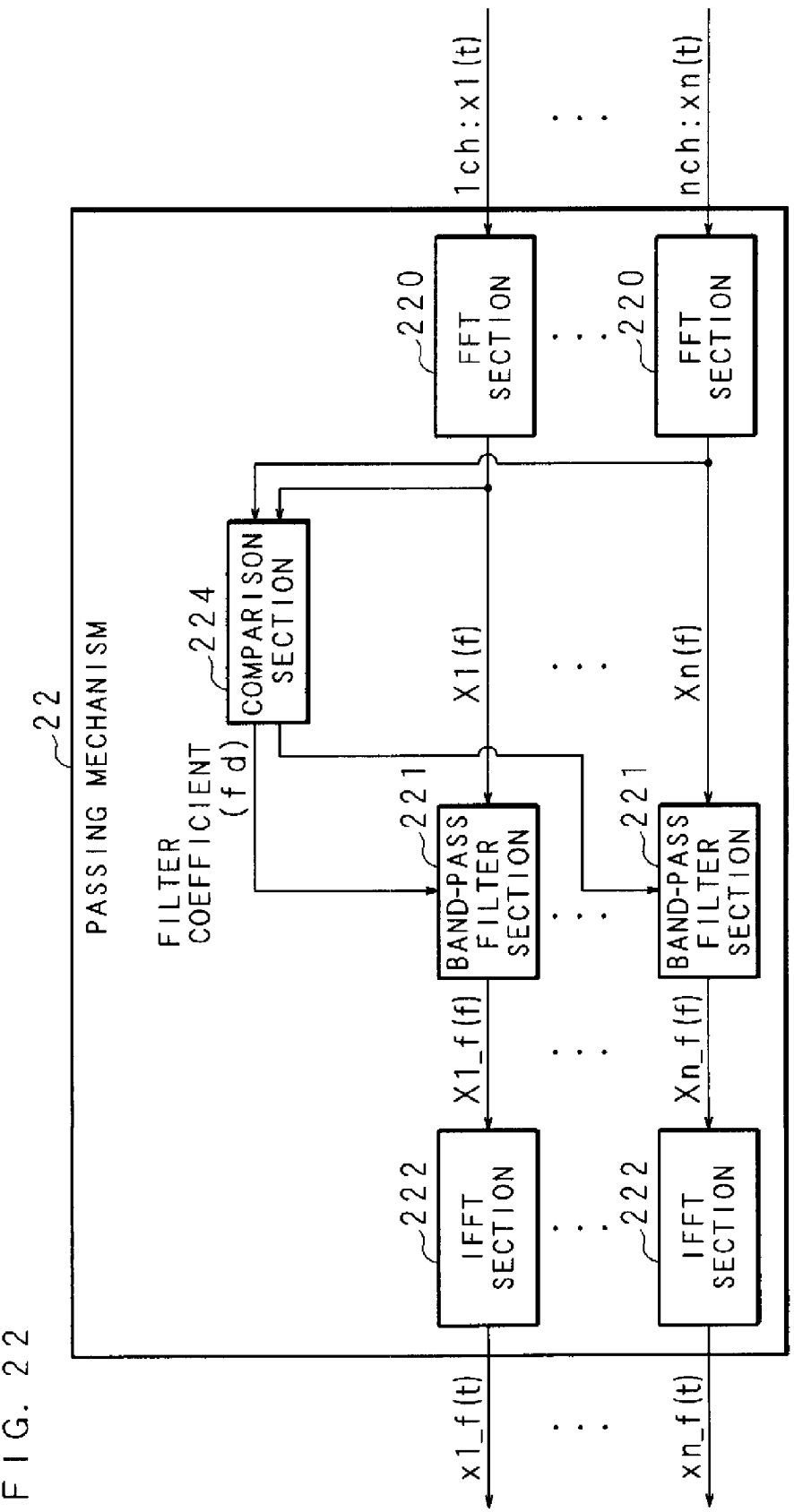
FIG. 22 is a functional block diagram illustrating an example of the passing mechanism in the sound output device according to Embodiment 5.

FIG. 22 is a functional block diagram illustrating an example of the passing mechanism 22 in the sound output device 2 according to Embodiment 5. The passing mechanism 22 according to Embodiment 5 includes a comparison section 224 for comparing amplitude of sound signals $X1(f), \ldots, Xn(f)$ of channels, with one another, which are converted into components on a frequency axis in frames, to dynamically change the filter coefficient of each of the band-pass filter sections 221, 221, . . . based on the correlation among the compared amplitudes. Note that, instead of comparing the amplitude of each of the sound signals $X1(f), \ldots, Xn(f)$ with one another, a power which is a square of amplitude may also be used for comparison as an alternative value for the amplitude.

The comparison section 224 derives a correlation among each of the sound signals $X1(f), \ldots, Xn(f)$ by each frequency band for every given number of frames or at given time intervals. The correlation is derived by comparing the amplitude of each of the sound signals with one another. If, as a result of comparison, it is determined that there is one sound signal with amplitude larger by a given value than all the other sound signals, the sound signals $X1(f), \ldots, Xn(f)$ are considered to have a weak correlation with one another, and the one sound signal with the largest amplitude is derived. Comparison of the amplitude between the one sound signal and another sound signal is performed by determining whether or not the comparison result obtained by a given comparison method, such as a ratio of the amplitude of the one sound signal to the amplitude of another sound signal, a difference obtained by subtracting the amplitude of another sound signal from the amplitude of one sound signal, a ratio or a difference between the absolute figures of amplitude, and a ratio or a difference between powers, each of which is a square of amplitude, is equal to or larger than a preset given value. The given value used for comparison is set so as to satisfy a condition under which all the other sound signals have amplitude small enough to be ignored compared to the amplitude of the one sound signal.

For example, the amplitude of the nth channel nch at frequency f is indicated as nch(f) while the given value is set as α. When the formula (I) below is realized, it is determined that the correlation among sound signals $X1(f), \ldots, Xn(f)$ is weak and a sound signal with the largest amplitude is the sound signal Xn(f) which is a sound signal of the nth channel.

$$nch(f)/1ch(f) \geq \alpha, nch(f)/2ch(f) \geq \alpha, \qquad \text{formula (1)}$$

The comparison section 224 derives a filter coefficient for each of the band-pass filter sections 221, 221, . . . at a deflection frequency fd indicating the frequency f at which the correlation among the sound signals $X1(f), \ldots, Xn(f)$ is determined as weak. The comparison section 224 derives 1.0 as a filter coefficient for the band-pass filter section 221 concerning the sound signal of a channel with maximum amplitude, while it derives 0.0 as a filter coefficient for band-pass filter section 221 concerning the sound signals of other channels. The comparison section 224 then sends the filter coefficients for the band-pass filter sections 221, 221, . . . at the deflection frequency fd to the corresponding band-pass filter sections 221, 221, . . . , respectively.

When the filter coefficient at the deflection frequency fd is received, each of the band-pass filter sections 221, 221, . . . changes the filter coefficient at the deflection frequency fd to the received filter coefficient. That is, it is set such that only the sound signal with the maximum amplitude passes through.

As a result of comparison by the comparison section 224, if it is determined that there is no one sound signal with amplitude equal to or larger than a given value compared to the amplitude of all the other sound signals, it is presumed that the correlation among the sound signals $X1(f), \ldots, Xn(f)$ is strong. If it is presumed that the correlation is strong, the comparison section 224 does not derive a deflection frequency fd or a filter coefficient. Hence, the band-pass filter sections 221, 221, . . . performs processes similar to those in Embodiment 1 described earlier.

Such a circumstance that the correlation among the sound signals $X1(f), \ldots, Xn(f)$ is low while the amplitude concerning one sound signal is larger than the amplitude concerning the other sound signals occurs when, for example, a solo which has an output emphasized in one channel is being played in an orchestra music with a plurality of channels. In such circumstances, listeners will feel uncomfortable for the output sound if the sound signal concerning the instrument which plays solo is suppressed at the band-pass filter sections 221, 221, . . . . According to Embodiment 5, in such circumstances, the sound based on the sound signal concerning an instrument for playing solo is selected as a sound to be output, allowing sound with a less sense of discomfort to be output.

Figure 23:
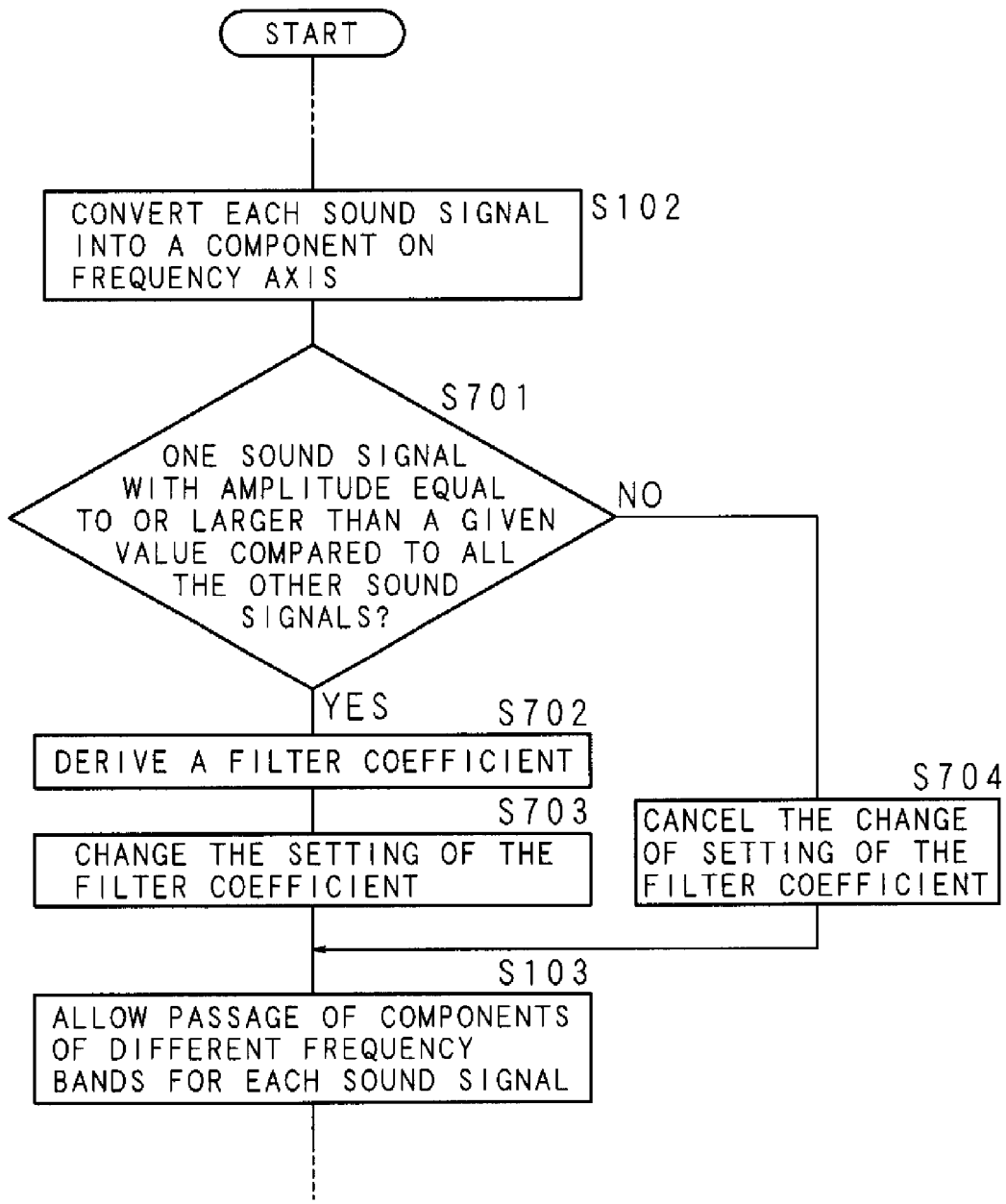
FIG. 23 is an operation chart illustrating an example of the sound output process performed by the sound output device according to Embodiment 5.

Next, processes performed by devices included in the echo suppressing system according to Embodiment 5 will be described. FIG. 23 is an operation chart illustrating an example of the sound output process performed by the sound output device 2 according to Embodiment 5. In Embodiment 5, the processes at the operations S101 and S102 of the sound output process according to Embodiment 1 are executed. The passing mechanism 22 in the sound output device 2 compares, by the comparison section 224, the amplitude of each of the sound signals $X1(f), \ldots, Xn(f)$ with one another for each frequency band, and determines if the correlation among the sound signals $X1(f), \ldots, Xn(f)$ is weak and if there is one sound signal with amplitude equal to or larger than a given value compared to amplitude of all the other sound signals (at the operation S701).

If, at the operation S701, it is determined that the correlation among the sound signals $X1(f), \ldots, Xn(f)$ is weak and there is one sound signal with amplitude equal to or larger than a given value compared to amplitude of all the other sound signals (at the operation S701:YES), the passing mechanism 22 in the sound output device 2 identifies, by the comparison section 224, one sound signal with the maximum amplitude at the frequency f, i.e. the deflection frequency fd, derives a filter coefficient for each of the band-pass filter sections 221, 221, . . . based on the identified sound signal (at the operation S702), and sends the derived filter coefficient to each of the corresponding band-pass filter sections 221, 221, . . . as a filter coefficient at the deflection frequency fd. At the operation S702, the filter coefficient of the band-pass filter section 221 concerning the one sound signal with the maximum amplitude is derived as 1.0, while the filter coefficient of the band-pass filters 221, 221, . . . concerning the other sound signals is derived as 0.0.

The passing mechanism 22 in the sound output device 2 changes the setting of the filter coefficient at the deflection frequency fd for each of the band-pass filter sections 221, 221, . . . to each of the received filter coefficients (at the operation S703). The sound output device 2 then executes the processes from the operation S103 on described in the sound output process of Embodiment 1.

If, at the operation S701, it is determined that the correlation among each of the sound signals X1(f), . . . , Xn(f) is strong and there is no one sound signal with amplitude equal to or larger than a given value compared to the amplitude of all the other sound signals (at the operation S701:N0), the passing mechanism 22 of the sound output device 2 cancels the change of setting of the filter coefficient for each of the band-pass filter sections 221, 221, . . . (at the operation S704). Cancelling the change at the operation S704 is a process for cancelling the changed setting if the setting of a filter coefficient is changed at the operation S703, and bringing back the setting to that of the original filter coefficient. Thus, if the filter coefficient has not been changed, no substantial process is performed. Even when the setting of the filter coefficient has been changed, however, it is not always necessary to bring back the setting to that of the original filter coefficient, since the primary process which allows passage of only the component of one sound signal at the frequency has been performed at the frequency. The sound output device 2 then executes the processes from the operation S103 on described in the sound output process of Embodiment 1.

Since other configurations and processes are similar to those in Embodiment 1, reference shall be made to Embodiment 1 and description thereof will not be repeated here.

Figure 24:
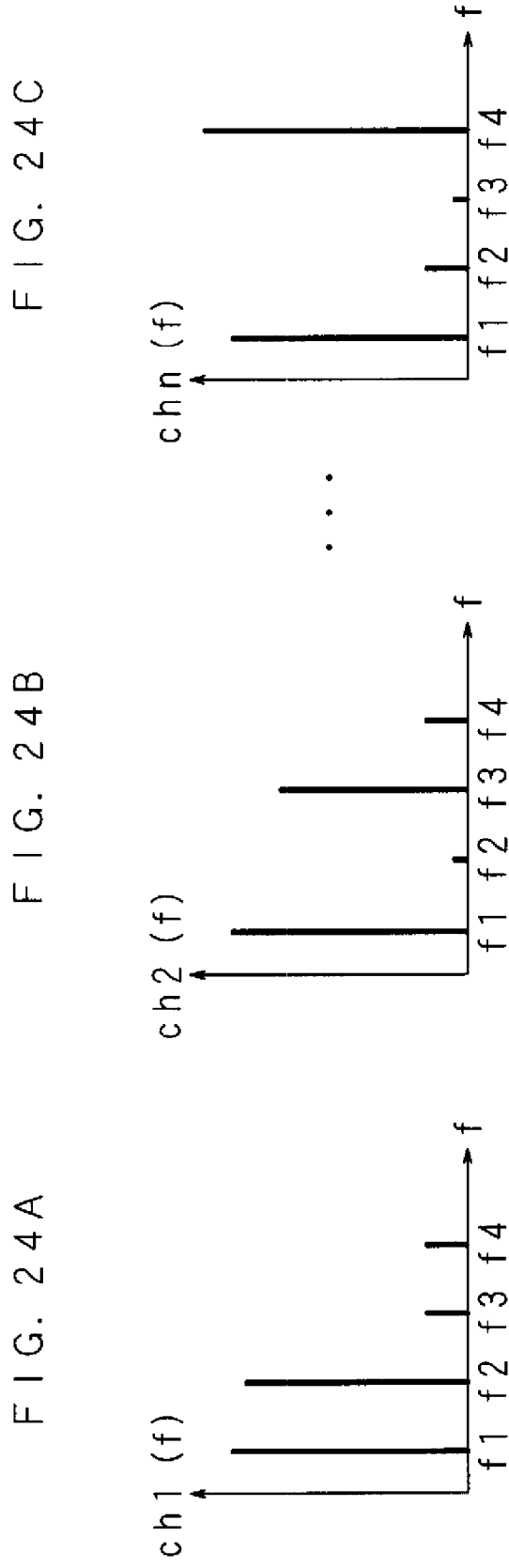
FIGS. 24A-24C are explanatory diagrams conceptually illustrating an example of the process performed by the passing mechanism included in the sound output device according to Embodiment 5.

FIGS. 24A-24C are explanatory diagrams conceptually illustrating an example of the process performed by the passing mechanism 22 included in the sound output device 2 according to Embodiment 5. FIGS. 24A-24C illustrates graphs indicating amplitude with respect to frequency f at a certain point for each channel concerning a sound signal. FIG. 24A represents the first channel ch1(f), FIG. 24B represents the second channel ch1(f), and FIG. 24C represents the nth channel chn(f). At the frequency f1, there is a high correlation among channels, so that the passing mechanism 22 performs a process based on a preset filter coefficient. At the frequency f2, the correlation is low while the amplitude of the sound signal concerning the first channel ch1(f) is large. Thus, the filter coefficient for the band-pass filter section 221 concerning the first channel ch1(f) is 1.0, whereas the filter coefficient for the band-pass filter sections 221, 221, . . . concerning the other channels is 0.0. Moreover, at the frequency f3, the correlation is low while the amplitude of the sound signal concerning the second channel ChM is large. Thus, the filter coefficient for the band-pass filter section 221 concerning the second channel ch2(f) is 1.0, whereas the filter coefficient for the band-pass filter sections 221, 221, . . . concerning the other channels is 0.0. Furthermore, at the frequency f4, the correlation is low while the amplitude of the sound signal concerning the nth channel chn(f) is large. Thus, the filter coefficient for the band-pass filter section 221 concerning the nth channel chn(f) is 1.0, whereas the filter coefficient for the band-pass filter sections 221, 221, . . . is 0.0.

The present embodiment further discloses a technique of changing over time a component of a frequency band for each sound signal to be passed through.

In the present embodiment, a certain sound signal will not be kept blocked in a certain frequency band even when there is a bias in the outputs of sound signals, so that sound without a sense of discomfort may be output at a plurality of channels, presenting a beneficial effect.

Embodiment 6

Embodiment 6 is an example where, in Embodiment 5, the method of setting a filter coefficient is changed.

In the description below, for configuration parts similar to Embodiment 5 or Embodiment 1 on which Embodiment 5 is based, reference shall be made to Embodiment 5 or Embodiment 1, and description thereof will not be repeated here. Since the configuration example of the echo suppressing system in Embodiment 6 is similar to Embodiment 1 described with reference to FIG. 4, reference shall be made to Embodiment 1 and description thereof will not be repeated.

Figure 25:
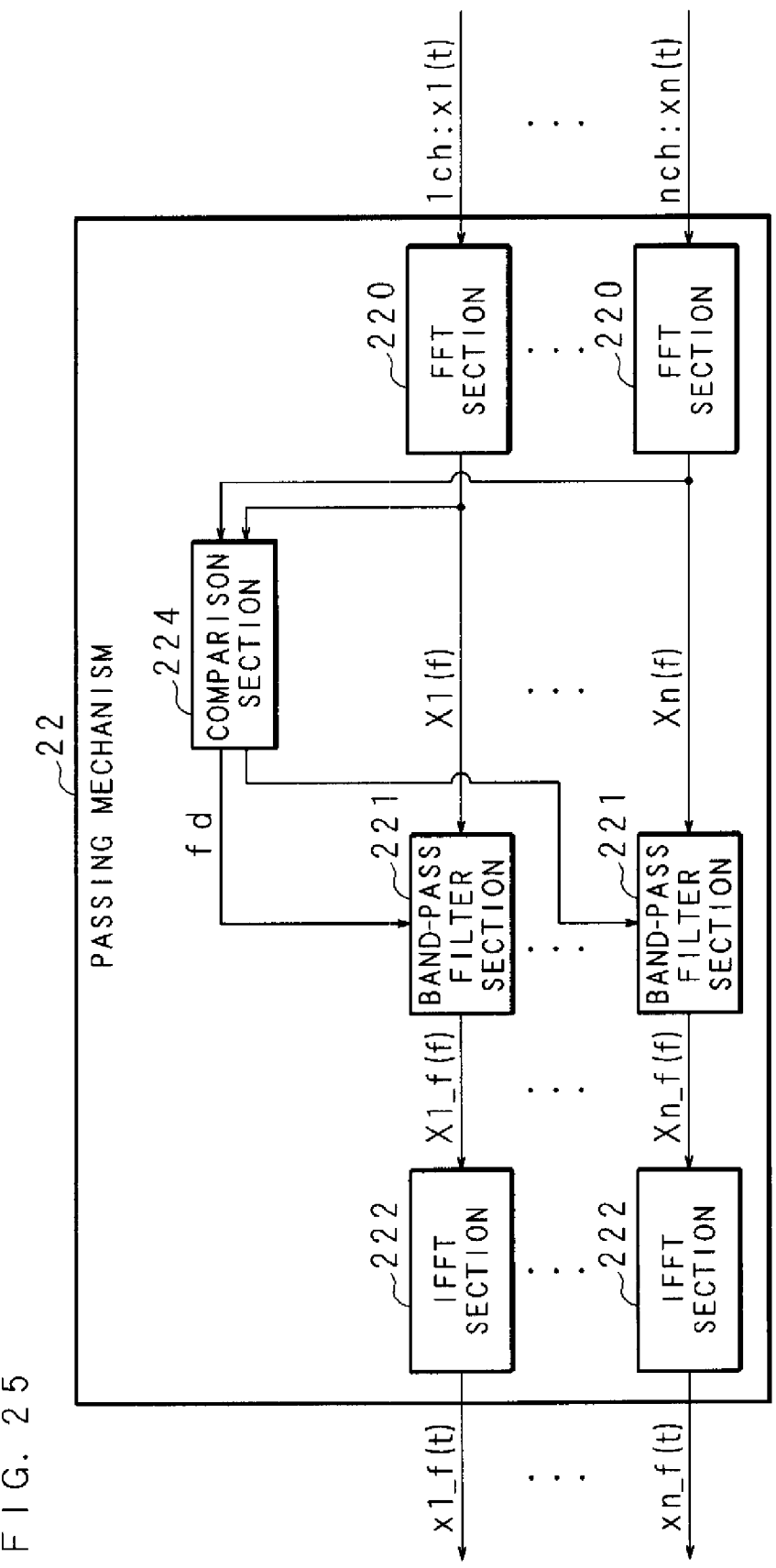
FIG. 25 is a functional block diagram illustrating an example of the passing mechanism of the sound output device according to Embodiment 6.

FIG. 25 is a functional block diagram illustrating an example of the passing mechanism 22 of the sound output device 2 according to Embodiment 6. The comparison section 224 included in the passing mechanism 22 determines whether or not there is one sound signal with amplitude equal to or larger than a given value compared to the amplitude of all the other sound signals, for every given number of frames or at given time intervals, and if it determines that there is such one sound signal, the comparison section 224 sends the frequency, i.e. deflection frequency fd to each of the band-pass filter sections 221, 221, . . . .

At the band-pass filter sections 221, 221, . . . , when the deflection frequency fd is received, the filter coefficient at the received deflection frequency fd is changed to 1.0. By thus setting the filter coefficient of all the band-pass filter sections 221, 221, . . . to 1.0, all the sound signals X1(f), . . . , Xn(f) may pass through. Compared to the amplitude of one sound signal, the amplitude of all the other sound signals is small enough to be ignored, so that an effect substantially similar to Embodiment 5 may be obtained even when all the sound signals X1(f), . . . , Xn(f) passed through.

As a result of comparison by the comparison section 224, if it is determined that there is no one sound signal with amplitude equal to or larger than a given value compared to the amplitude of all the other sound signals, it is presumed that the correlation among the sound signals X1(f), . . . , Xn(f) is strong. If it is presumed that the correlation is strong, the comparison section 224 does not derive the deflection frequency fd. Hence, at the band-pass filter sections 221, 221, . . . , processes similar to Embodiment 1 described earlier are executed. It is noted that the comparison section 224 may not only send the deflection frequency fd to the band-pass filter sections 221, 221, . . . , but also send a filter coefficient for each of the band-pass filter sections 221, 221, . . . at the deflection frequency fd to each of the corresponding band-pass filter sections 221, 221, . . . . Here, the filter coefficients sent from the comparison section 224 to the band-pass filter sections 221, 221, . . . are all 1.0.

Figure 26:
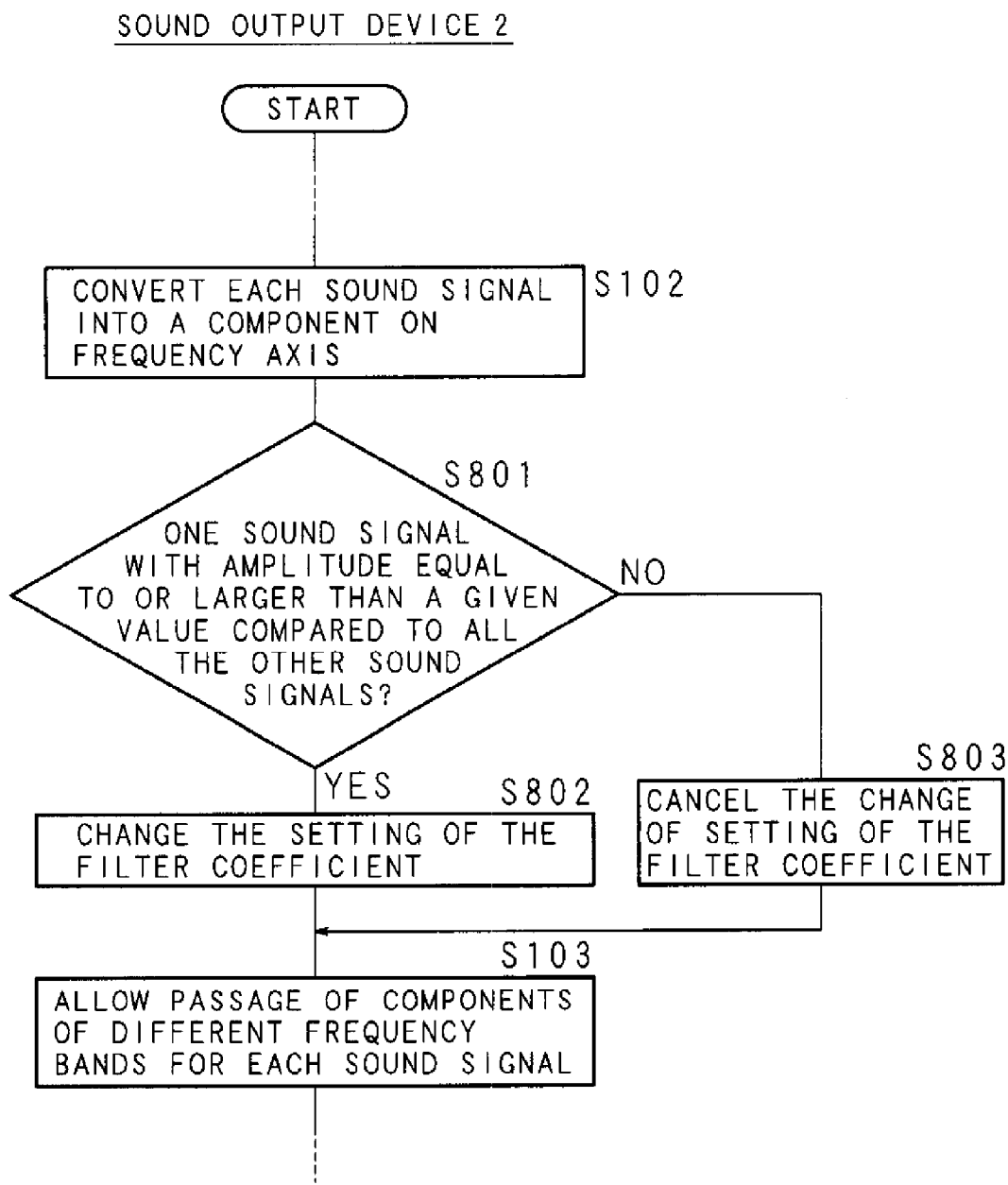
FIG. 26 is an operation chart illustrating an example of the sound output process performed by the sound output device according to Embodiment 6.

Next, processes performed by devices included in the echo suppressing system according to Embodiment 6 will be described. FIG. 26 is an operation chart illustrating an example of the sound output process performed by the sound output device 2 according to Embodiment 6. In Embodiment 6, processes at the operations S101 to S102 in the sound output process according to Embodiment 1 are executed. The passing mechanism 22 of the sound output device 2 compares, by the comparison section 224, the amplitude of each of the sound signals X1(f), . . . , Xn(f) for each frequency band, and determines whether or not the correlation among the sound signals X1(f), . . . , Xn(f) is weak and there is one sound signal with amplitude equal to or larger than a given value compared to the amplitude of all the other sound signals (at the operation S801).

At the operation S801, if it is determined that the correlation among the sound signals X1(f), . . . , Xn(f) is weak and there is one sound signal with amplitude equal to or larger than a given value compared to the amplitude of all the other sound signals (at the operation S801:YES), the passing mechanism 22 of the sound output device 2 sends the deflection frequency fd from the comparison section 224 to each of the band-pass filter sections 221, 221, . . . .

The passing mechanism 22 of the sound output device 2 changes the setting of the filter coefficient for each of the band-pass filter sections 221, 221, . . . at the deflection frequency fd to 1.0 (at the operation S802). The sound output device 2 then executes the processes from the operation S103 on described in the sound output process in Embodiment 1.

At the operation S801, if it is determined that the correlation among the sound signals X1(f), . . . , Xn(f) is strong and there is no one sound signal with amplitude equal to or larger than a given value compared to the amplitude of all the other sound signals (at the operation S801:NO), the passing mechanism 22 of the sound output device 2 cancels change of setting of the filter coefficient for each of the band-pass filter sections 221, 221, . . . (at the operation S803). Cancellation of change at the operation S803 is a process of canceling the changed setting, when setting of the filter coefficient has been changed at the operation S802, and bringing back the original setting of the filter coefficient. Hence, if the filter coefficient has not been changed, no substantial process is performed. The sound output device 2 then executes the processes from the operation S103 on described in the sound output process of Embodiment 1.

As a process of the operation S103 executed after the process of the operations S801 to S803, the passing mechanism 22 of the sound output device 2 allows, by the band-pass filter sections 221, 221, . . . , passage of components X1_(f), . . . , Xn_f(f) of different frequency bands for a plurality of sound signals X1(f), . . . , Xn(f) converted into components on a frequency axis. It is noted that, though one sound signal passes through for each frequency f, all sound signals X1(fd), . . . , Xn(fd) pass through for the components of the deflection frequency fd.

Since the other configurations and processes are similar to those in Embodiment 1, reference shall be made to Embodiment 1 and description thereof will not be repeated here.

Embodiment 7

Embodiment 7 is an example where, in Embodiment 1, a filter coefficient for each of the band-pass filter sections is changed over time.

In the description below, configuration parts similar to those in Embodiment 1 are denoted by reference codes similar to those of Embodiment 1, and will not be described here in detail. Since the configuration example of the echo suppressing system according to Embodiment 7 is similar to Embodiment 1 described with reference to FIG. 4, reference shall be made to Embodiment 1 and description thereof will not be repeated.

Figure 27:
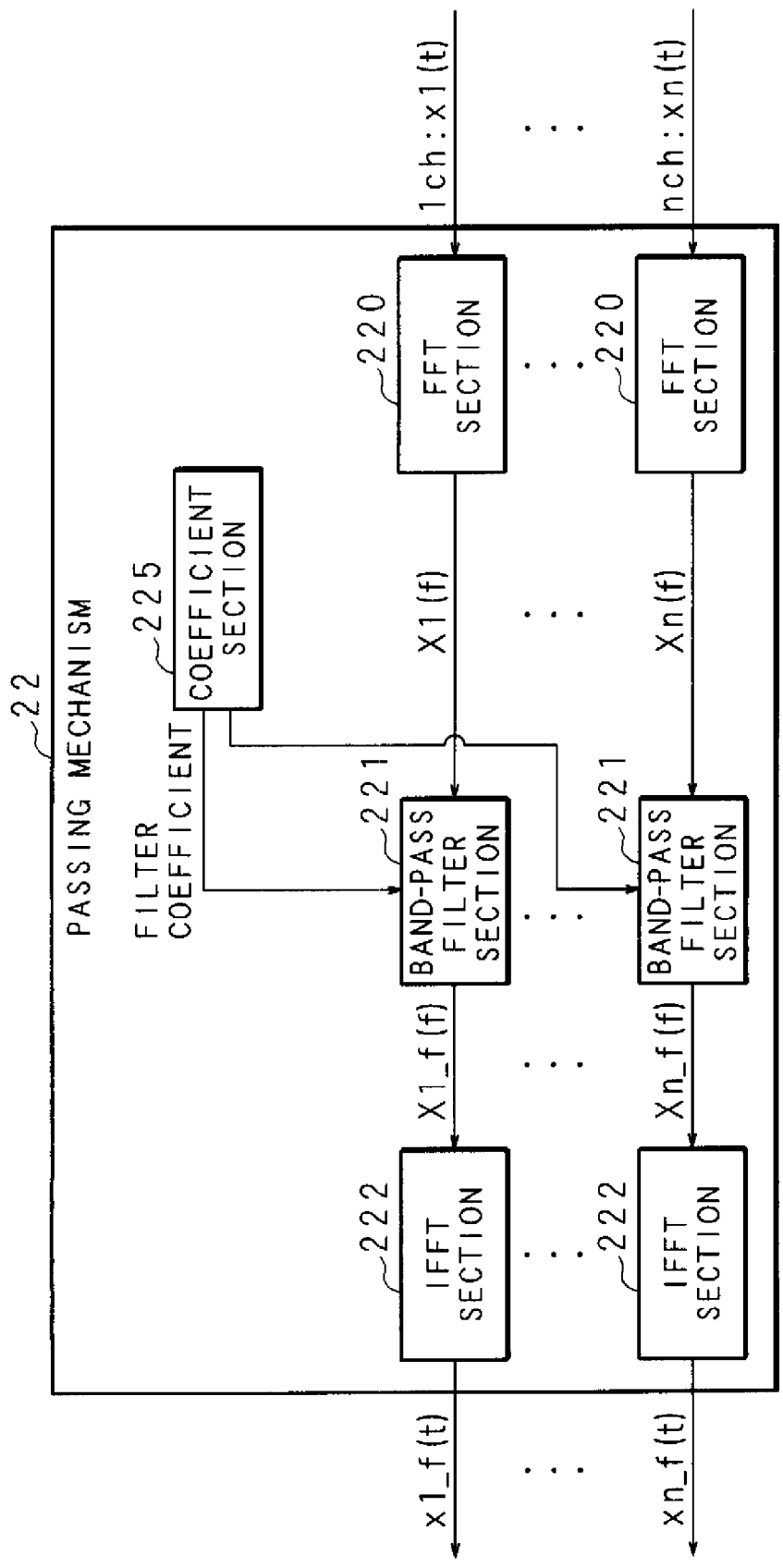
FIG. 27 is a functional block diagram illustrating an example of the passing mechanism in the sound output device according to Embodiment 7.

FIG. 27 is a functional block diagram illustrating an example of the passing mechanism 22 in the sound output device 2 according to Embodiment 7. The passing mechanism 22 according to Embodiment 7 includes a coefficient section 225 for changing a filter coefficient for each of the band-pass filter sections 221, 221, . . . .

The coefficient section 225 includes a clock circuit (not illustrated) for obtaining time, and derives a filter coefficient for each of the band-pass filter sections 221, 221, . . . at given time intervals. The coefficient section 225 derives 1.0 as a filter coefficient for one band-pass filter section 221, whereas is derives 0.0 as a filter coefficient for the other band-pass filter sections 221, 221, . . . . It is noted that the band-pass filter section 221 with the filter coefficient set as 1.0 changes every time. The coefficient section 225 derives a filter coefficient by various methods such as the use of a table in which a filter coefficient is pre-recorded in association with time, and the use of a given function for outputting a filter coefficient. The derived filter coefficient for each of the band-pass filter sections 221, 221, . . . is sent to each of the corresponding band-pass filter sections 221, 221, . . . .

At the band-pass filter sections 221, 221, . . . , each filter coefficient is changed to the received filter coefficient. The coefficient section 225 derives a filter coefficient which is changed every time at given time intervals, so that the filter coefficient for each of the band-pass filter sections 221, 221, . . . is changed at given time intervals, i.e., is changed over time. Accordingly, the passing mechanism 22 changes over time a component in a frequency band for each sound signal to be passed through. To change a filter coefficient over time, the filter coefficient may also be changed for every given number of frames instead of being changed based on time indicated by the clock circuit.

Figure 28:
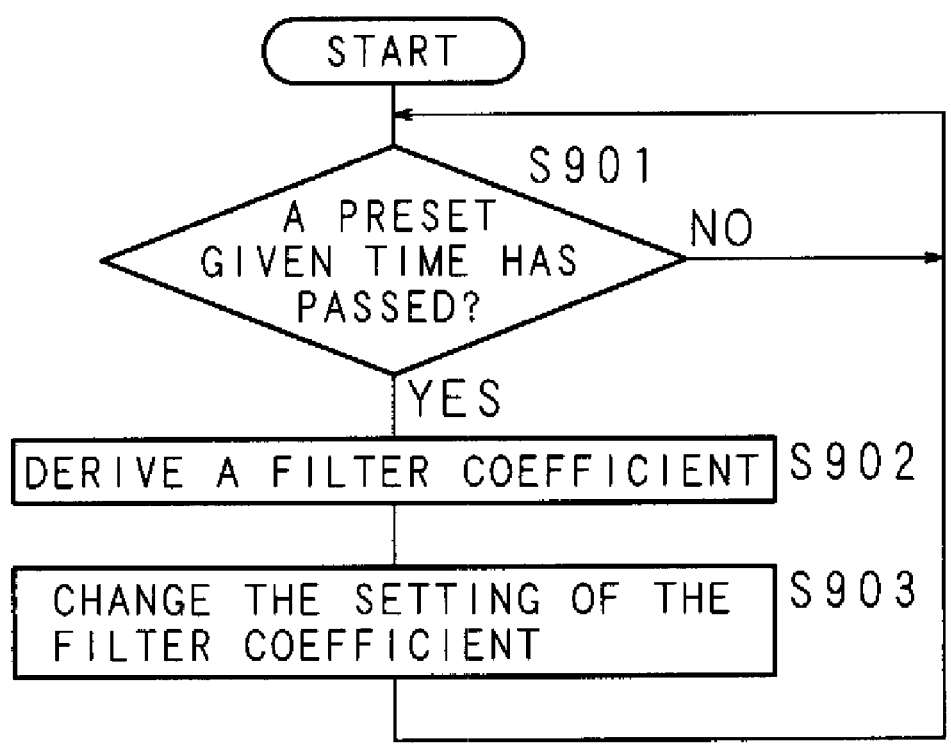
FIG. 28 is an operation chart illustrating an example of the coefficient changing process performed by the sound output device according to Embodiment 7.

Next, processes performed by devices included in the echo suppressing system according to Embodiment 7 will be described. FIG. 28 is an operation chart illustrating an example of the coefficient changing process performed by the sound output device 2 according to Embodiment 7. The coefficient section 225 of the passing mechanism 22 in the sound output device 2 refers to the clock circuit and determines whether or not a preset given time has passed (at the operation S901).

If, at the operation S901, it is determined that the given time has passed (at the operation S901:YES), the coefficient section 225 in the passing mechanism 22 of the sound output device 2 derives a filter coefficient for each of the band-pass filter sections 221, 221, . . . (at the operation S902) and sends the derived filter coefficient to each of the corresponding band-pass filter sections 221, 221, . . . . If, at the operation S901, it is determined that a given time has not passed (at the operation S901:NO), the process of the operation S901 is repeated.

The passing mechanism 22 of the sound output device 2 changes the setting of a filter coefficient for each of the band-pass filter sections 221, 221, . . . (at the operation S903). By the process of changing a coefficient, the passing mechanism 22 changes over time a component of a frequency band for each sound signal to be passed through.

The other sections and processes are similar to those in Embodiment 1, reference shall be made to Embodiment 1 and description thereof will not be repeated.

FIGS. 29A-29F are explanatory diagrams illustrating an example of change over time of a filter coefficient for each of the band-pass filter sections 221, 221, . . . in the passing mechanism 22 included in the sound output device 2 according to Embodiment 7. FIGS. 29A, 29B and 29C illustrate coefficient filters C1(f), C2(f) and Cn(f) for sound signals X1(f), X2(f) and Xn(f) of the first channel 1ch, the second channel 2ch and the nth channel nch, respectively, each graph representing the relationship between frequency f indicated on the horizontal axis and a filter coefficient indicated on the vertical axis. FIGS. 29D, 29E and 29F illustrate coefficient filters C1(f), C2(f) and Cn(f) for sound signals X1(f), X2(f) and Xn(f) of the first channel 1ch, the second channel 2ch and the nth channel nch after a given time has passed from the state illustrated in FIGS. 29A, 29B and 29C, respectively. As can be clearly seen by comparing FIGS. 29A, 29B and 29C with FIGS. 29D, 29E and 29F, the value of a coefficient filter for each channel, i.e. a filter coefficient, is changed over time. Thus, a component of a frequency band for every sound signal to be passed is changed over time.

While Embodiments 1 to 7 merely illustrate a part of countless embodiments, various hardware and software may be available as appropriate, and various processes other than the described basic processes may also be incorporated. For example, the echo suppressing system may be applied to various systems concerning sound or audio, other than a navigation system and a television system. Moreover, for the echo suppressor, the sound output device, the sound input device and the sound processing device, all devices or appropriately-selected two or three devices may be available as one device. Moreover, one device may also be available as a plurality of devices, such that the sound output device is divided into a sound signal generating device for generating a sound signal and a sound output device. Furthermore, though each of Embodiments 1 to 7 illustrated an example where a comb filter is formed by setting a filter coefficient as 0.0 or 1.0, a filter with various other characteristics such as a trapezoidal filter and a triangular filter may also be formed by setting the filter coefficient to also take a value larger than 0.0 and smaller than 1.0. Each of Embodiments 1 to 7 may appropriately be combined with one another instead of being implemented independently.

What is claimed is:

1. An echo suppressing system, comprising:
   a sound output device for outputting sound based on a sound signal, wherein the passing section comprises a plurality of bandpass filters including
      a passing section for allowing passage of a component of a different frequency band for each of a plurality of sound signals, and
      a plurality of sound output sections, each of which outputs sound based on each of the plurality of sound signals passed through the passing section;
   a summer for summing the plurality of sound signals passed through the passing section to generate a reference sound signal;
   a sound input device for converting input sound into a sound signal; and
   an echo suppressor for suppressing echo based on the sound output by the sound output device from the sound input to the sound input device, including
      an input section to which a sound signal is input from the sound input device as an observation sound signal, and
      a correction section for correcting the observation sound signal so as to suppress echo included in the observation sound signal based on the observation sound signal and the reference sound signal,
   wherein
      the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value,
      the passing section allows passage of only the one sound signal for a frequency band determined to have a value equal to or larger than a given value by the comparison section, and
      the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

2. The echo suppressing system according to claim 1, wherein the passing section includes
   a first conversion section for converting each of a plurality of sound signals into components on a frequency axis,
   a band-pass filter section for allowing passage of a component of a different frequency band for each of the plurality of sound signals converted into components on a frequency axis, and
   a second conversion section for converting each of the plurality of sound signals, which is converted in to components on a frequency axis by passage of a component of each frequency band, into a sound signal on a time axis.

3. The echo suppressing system according to claim 2, wherein
   each of the plurality of sound signals for which the passing section allows passage of a component of a different frequency band is a processed sound signal obtained by processing a first sound signal, a second sound signal, or at least one of the first sound signal and the second sound signal by a given processing method, and
   the band-pass filter section includes
      a first filter coefficient set for the first sound signal,
      a second filter coefficient set for the second sound signal, and
      a processing filter coefficient set for the processed sound signal on the basis of at least one of the first filter coefficient and the second filter coefficient depending on a processing method.

4. The echo suppressing system according to claim 3, wherein
   the processed sound signal includes
      a chord signal which is a sum of the first sound signal and the second sound signal,
      a delayed first sound signal which is obtained by delaying the first sound signal by a given time, and
      a delayed second sound signal obtained by delaying the second sound signal by a given time, and
   for the processing filter coefficient, a filter coefficient based on the sum of the first sound signal and the second sound signal is set for the chord signal, a filter coefficient based on the first filter coefficient is set for the delayed first sound signal, and a filter coefficient based on the second filter coefficient is set for the delayed second sound signal.

5. The echo suppressing system according to claim 1, wherein the passing section allows passage of a component of each frequency band divided into frequency bands by a frequency width.

6. The echo suppressing system according to claim 2, wherein the passing section allows passage of a component of each frequency band divided into frequency bands by a frequency width.

7. The echo suppressing system according to claim 3, wherein the passing section allows passage of a component of each frequency band divided into frequency bands by a frequency width.

8. The echo suppressing system according to claim 4, wherein the passing section allows passage of a component of each frequency band divided into frequency bands by a frequency width.

9. The echo suppressing system according to claim 1, wherein the passing section allows passage of a component of each frequency band for which logarithmic value of a frequency band is divided by a logarithmic-frequency width.

10. The echo suppressing system according to claim 1, wherein
the sound output device prohibits passage of a component of each frequency band corresponding to a pre-set removal band for any sound signal, and
the correction section includes
a correction filter section which derives an amount of correction to be required for correction of the observation sound signal by filtering the reference sound signal with a filter coefficient which is set for each frequency,
a coefficient renewal section for performing calculation and renewal of the filter coefficient of the correction filter based on the corrected observation sound signal, and
a renewal determination section for determining whether or not renewal by the coefficient renewal section is possible based on a component of the removal band for the observation sound signal.

11. The echo suppressing system according to claim 1, wherein the passing section changes a component of a frequency band with time for each sound signal to be passed through.

12. An echo suppressing method using a sound output device for outputting sound based on a sound signal, wherein the passing section comprises a plurality of bandpass filters, a sound input device to which sound is input, and an echo suppressor for suppressing echo based on the sound output by the sound output device from the sound input to the sound input device, the echo suppressing method comprising:
passing, using the sound output device, a component of a different frequency band for each of a plurality of sound signals;
outputting, using the sound output device, sound based on a plurality of sound signals for which components of different frequency bands passed through;
converting, using the sound input device, the input sound into a sound signal;
summing, using the echo suppressor, a plurality of sound signals for which components of different frequency bands passed through, to generate a reference sound signal,
acquiring, using the echo suppressor, a sound signal from the sound input device as an observation sound signal; and
correcting, using the echo suppressor, the observation sound signal so as to suppress echo included in the observation sound signal based on the observation sound signal and the reference sound signal,
wherein
the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value,
the passing section allows passage of only the one sound signal for a frequency band determined to have a value equal to or larger than a given value by the comparison section, and
the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

13. A non-transitory computer readable recording medium recording a program for making an echo suppressor execute, in cooperation with a sound output device for outputting sound based on a sound signal and a sound input device for generating a sound signal based on input sound, suppression of echo based on the sound output by the sound output device from the sound input to the sound input device, the program comprising:
passing, using the sound output device, a component of a different frequency band for each of a plurality of sound signals, wherein the passing section comprises a plurality of bandpass filters;
correcting, using the echo suppressor, an observation sound signal so as to suppress echo included in the observation sound signal, based on a reference sound signal generated by summing a plurality of sound signals which are output by the sound output device and for which components of different frequency bands passed through, and the observation sound signal which is a sound signal generated by the sound input device,
wherein
the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value,
the passing section allows passage of only the one sound signal for a frequency band determined to have a value equal to or larger than a given value by the comparison section, and
the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

14. An echo suppressor for suppressing, in cooperation with a sound output device for outputting sound based on a sound signal and a sound input device for generating a sound signal based on input sound, echo based on the sound output by the sound output device from the sound input to the sound input device, the echo suppressor comprising a passing section passing, using the sound output device, a component of a different frequency band for each of a plurality of sound signals, wherein the passing section comprises a plurality of bandpass filters;

a summer for summing a plurality of sound signals which are output by the sound output device and for which components of different frequency bands passed through, to generate a reference sound signal;

an input section to which a sound signal is input from the sound input device as an observation sound signal; and a correction section for correcting the observation sound signal so as to suppress echo included in the observation sound signal based on the observation sound signal and the reference sound signal, wherein the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value, the passing section allows passage of only the one sound signal for a frequency band determined to have a value equal to or larger than a given value by the comparison section, and the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

15. A sound output device cooperating with a sound input device for generating a sound signal based on input sound and an echo suppressor for suppressing echo based on the sound output based on the generated sound signal from the sound input to the sound input device, comprising:

a plurality of sound output sections for outputting sound based on a plurality of sound signals; and a passing section for allowing passage of a component of a different frequency band for each of a plurality of sound signals; wherein the plurality of sound output sections output sound based on a plurality of sound signals passed through the passing section, wherein the passing section comprises a plurality of bandpass filters, wherein the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value, the passing section allows passage of only the one sound signal for a frequency band determined to have a value equal to or larger than a given value by the comparison section, and the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

16. An audio system, comprising:

a sound output device for outputting sound based on a sound signal, including a passing section for allowing passage of a component of a different frequency band for each of a plurality of sound signals, wherein the passing section comprises a plurality of bandpass filters and a plurality of sound output sections, each of which outputs sound based on each of a plurality of sound signals passed through the passing section;

a sound input device for converting input sound into a sound signal;

a summer for summing a plurality of sound signals passed through the passing section to generate a reference sound signal;

an echo suppressor for suppressing echo based on the sound output by the sound output device from the sound input to the sound input device, including an input section to which a sound signal is input from the sound input device as an observation sound signal, a correction section for correcting the observation sound signal so as to suppress echo included in the observation sound signal based on the observation sound signal and the reference sound signal, and an output section for outputting the observation sound signal corrected by the correction section to a control device; and a controller including a control section for controlling at least one of the sound output device, the sound input device and the echo suppressor, an input section to which the output observation sound signal after correction is input, and a recognition section for performing a voice recognizing process based on the corrected observation sound signal input from the input section; wherein the control section performs control based on a recognition result obtained by the recognition section, wherein the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value, the passing section allows passage of only the one sound signal for a frequency band determined to have a value equal to or larger than a given value by the comparison section, and the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

17. A navigation system, comprising:
a sound output device for outputting sound based on a sound signal, including
a passing section for allowing passage of a component of a different frequency band for each of a plurality of sound signals, wherein the passing section comprises a plurality of bandpass filters and
a plurality of sound output sections, each of which outputs sound based on each of a plurality of sound signals passed through the passing section;
a sound input device for converting input sound into a sound signal;
an echo suppressor for suppressing echo based on the sound output by the sound output device from the sound input to the sound input device, including
an input section to which a sound signal is input from the sound input device as an observation sound signal,
a correction section for correcting the observation sound signal so as to suppress echo included in the observation sound signal based on the observation sound signal and the reference sound signal, and
an output section for outputting the corrected observation sound signal to the navigation device;
a summer for summing a plurality of sound signals passed through the passing section to generate a reference sound signal; and
a navigation device including
a control section for performing a navigation process,
an input section to which the output observation sound signal after correction is input, and
a recognition section for performing a voice recognition process based on the corrected observation sound signal input from the input section; wherein
the control section performs a navigation process based on a recognition result obtained by the recognition section,
wherein
the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value,
the passing section allows passage of only the one sound signal for a frequency band determined to have a value equal to or larger than a given value by the comparison section, and
the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

18. A mobile object, comprising
a sound output device for outputting sound based on a sound signal, including
a passing section for allowing passage of a component of a different frequency band for each of a plurality of sound signals, wherein the passing section comprises a plurality of bandpass filters and
a plurality of sound output sections, each of which outputs sound based on each of a plurality of sound signals passed through the passing section;
a sound input device for converting input sound into a sound signal;
an echo suppressor for suppressing echo based on the sound output by the sound output device from the sound input to the sound input device, including
an input section to which a sound signal is input from the sound input device as an observation sound signal,
a correction section for correcting the observation sound signal so as to suppress echo included in the observation sound signal based on the observation sound signal and the reference sound signal, and
an output section for outputting the corrected observation sound signal to the navigation device;
a summer for summing a plurality of sound signals passed through the passing section to generate a reference sound signal; and
a navigation device including
a control section for performing a navigation process,
an input section to which the output observation sound signal after correction is input, and
a recognition section for performing a voice recognition process based on the corrected observation sound signal input from the input section; wherein
the control section performs a navigation process based on a recognition result obtained by the recognition section,
wherein
the sound output device further includes a comparison section for comparing amplitude of a plurality of sound signals with one another for each frequency band to determine whether or not a value indicating a comparison result obtained by comparing the amplitude of one sound signal having a maximum amplitude with the amplitude of all the other sound signals is equal to or larger than a given value,
the passing section allows passage of only the one sound signal for a frequency band determined to have a value equal to or larger than a given value by the comparison section, and
the passing section derives a filter coefficient for each of the bandpass filters based on the comparison and changes the setting of the filter coefficient, when the comparison yields a sound signal equal to or larger than a given value, otherwise the passing section cancels the change of setting of the filter coefficient for each of the frequency bands when the comparison yields a sound signal equal less than a given value.

* * * * *